(12) United States Patent
Yamaguchi

(10) Patent No.: US 6,954,759 B2
(45) Date of Patent: *Oct. 11, 2005

(54) DATA PROCESSING METHOD USING RECORD DIVISION STORING SCHEME AND APPARATUS THEREFOR

(75) Inventor: Kota Yamaguchi, Yamato (JP)

(73) Assignees: Hitachi, Ltd., Tokyo (JP); Hitachi Software Engineering Co., Ltd., Yokohama (JP)

( * ) Notice: Subject to any disclaimer, the term of this patent is extended or adjusted under 35 U.S.C. 154(b) by 598 days.

This patent is subject to a terminal disclaimer.

(21) Appl. No.: 09/796,562

(22) Filed: Mar. 2, 2001

(65) Prior Publication Data

US 2001/0007107 A1 Jul. 5, 2001

Related U.S. Application Data

(63) Continuation of application No. 09/324,731, filed on Jun. 3, 1999, now Pat. No. 6,216,203, which is a continuation of application No. 08/767,188, filed on Dec. 17, 1996, now Pat. No. 5,943,683, which is a continuation of application No. 08/087,162, filed on Jul. 2, 1993, now Pat. No. 5,586,292.

(30) Foreign Application Priority Data

Jul. 9, 1992 (JP) .......................................... 04-181950

(51) Int. Cl.[7] .......................... G06F 17/30; G06F 7/00; G06F 17/00; G06F 12/00; G06F 12/14
(52) U.S. Cl. .......................... 707/102; 707/100; 707/1; 711/114
(58) Field of Search ......................... 707/1, 100, 102; 711/114

(56) References Cited

U.S. PATENT DOCUMENTS

| | | | | |
|---|---|---|---|---|
| 3,931,612 A | * | 1/1976 | Stevens et al. | 707/7 |
| 4,092,732 A | * | 5/1978 | Ouchi | 714/5 |
| 4,575,798 A | * | 3/1986 | Lindstrom et al. | 707/7 |
| 4,780,808 A | * | 10/1988 | Moreno et al. | 711/4 |
| 5,175,852 A | | 12/1992 | Johnson et al. | |
| 5,257,362 A | | 10/1993 | Menon | |
| 5,263,145 A | * | 11/1993 | Brady et al. | 711/114 |
| 5,586,292 A | | 12/1996 | Yamaguchi | |
| 5,943,683 A | | 8/1999 | Yamaguchi | |

FOREIGN PATENT DOCUMENTS

| | | |
|---|---|---|
| JP | 01-106217 | 4/1989 |
| JP | 02-52305 | 2/1990 |

OTHER PUBLICATIONS

James Bradley, "File and Data Base Techniques," 1981 by CBS College Publishing, pp. 53–58.

* cited by examiner

Primary Examiner—Frantz Coby
Assistant Examiner—Cindy Nguyen
(74) Attorney, Agent, or Firm—Mattingly, Stanger, Malur & Brundidge, P.C.

(57) ABSTRACT

A record having a fixed length data portion and a variable length data portion is stored in memory units, each capable of being inputted/outputted independently, in unit of sub-record while the fixed length data portion is divided into a plurality of fixed length sub-records each having the same length and the variable length data portion is made one variable length sub-record. When data operation of the record such as retrieval, update and deletion is required, sub-records necessary for the data operation are limited and the data operation is made in a unit of one or more sub-records, so that data processing of unnecessary sub-records is not made.

14 Claims, 18 Drawing Sheets

EXAMPLE OF DATA STORAGE METHOD

FIG. 3

| RECORD NAME | VARIABLE/ FIXED LENGTH TYPE | RECORD LENGTH/ MAXIMUM RECORD LENGTH | NUMBER OF SUB-RECORD | | SUB-RECORD LENGTH | |
|---|---|---|---|---|---|---|
| | | | FIXED PORTION | VARIABLE PORTION | FIXED PORTION | VARIABLE PORTION |
| SUB-RECORD NAME | STORAGE FILE NAME | STORAGE ADDRESS | INPUT/OUTPUT BUFFER ADDRESS | SUB-RECORD MANAGEMENT FLAG | | |
| | | | | INPUT REQUEST | INPUTTED | OUTPUT REQUEST | OUTPUTTED |

FIG. 5 PROCESS OF RECORD RETRIEVAL PROCESSING UNIT

SUB-RECORD RETRIEVAL PROCESS

FIG. 7 PROCESS OF SUB-RECORD SELECTION PROCESSING UNIT

PROCESS (1) OF RECORD UPDATE PROCESSING UNIT

FIG. 9  PROCESS (2) OF RECORD UPDATE PROCESSING UNIT

FIG. 11 PROCESS OF RECORD DELETION PROCESSING UNIT

FIG. 12 PROCESS (1) OF RECORD STORAGE PROCESSING UNIT

PROCESS (2) OF RECORD STORAGE PROCESSING UNIT

FIG. 15
PROCESS OF UNIT-OF-SUB-RECORD INPUT/OUTPUT BUFFER MANAGEMENT PROCESSING UNIT (RETURN AND RELEASE)
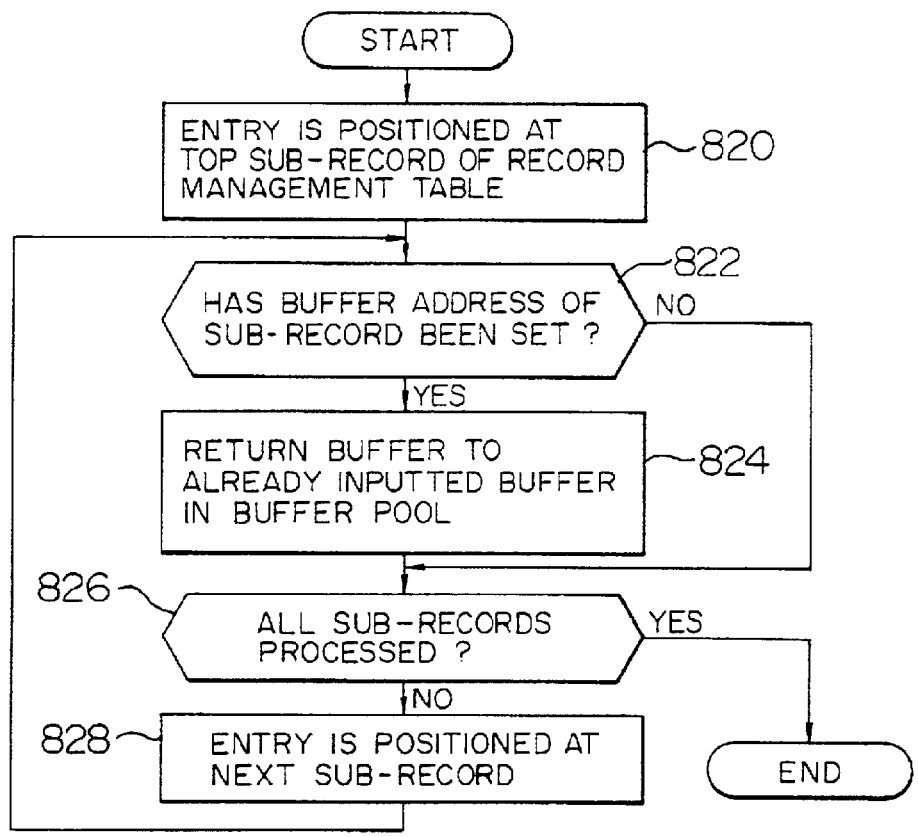
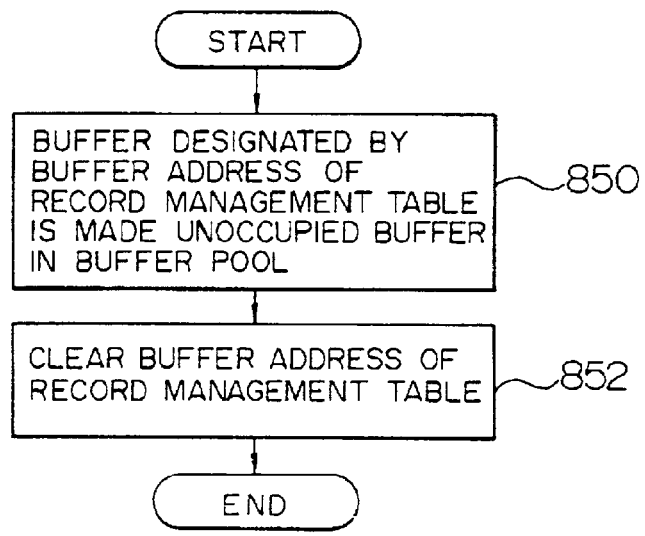

PROCESS OF UNIT-OF-SUB-RECORD INPUT/OUTPUT BUFFER MANAGEMENT PROCESSING UNIT (SECURING)

FIG. 17 PROCESS OF UNIT-OF-SUB-RECORD PARALLEL INPUT/OUTPUT PROCESSING UNIT (INPUT)
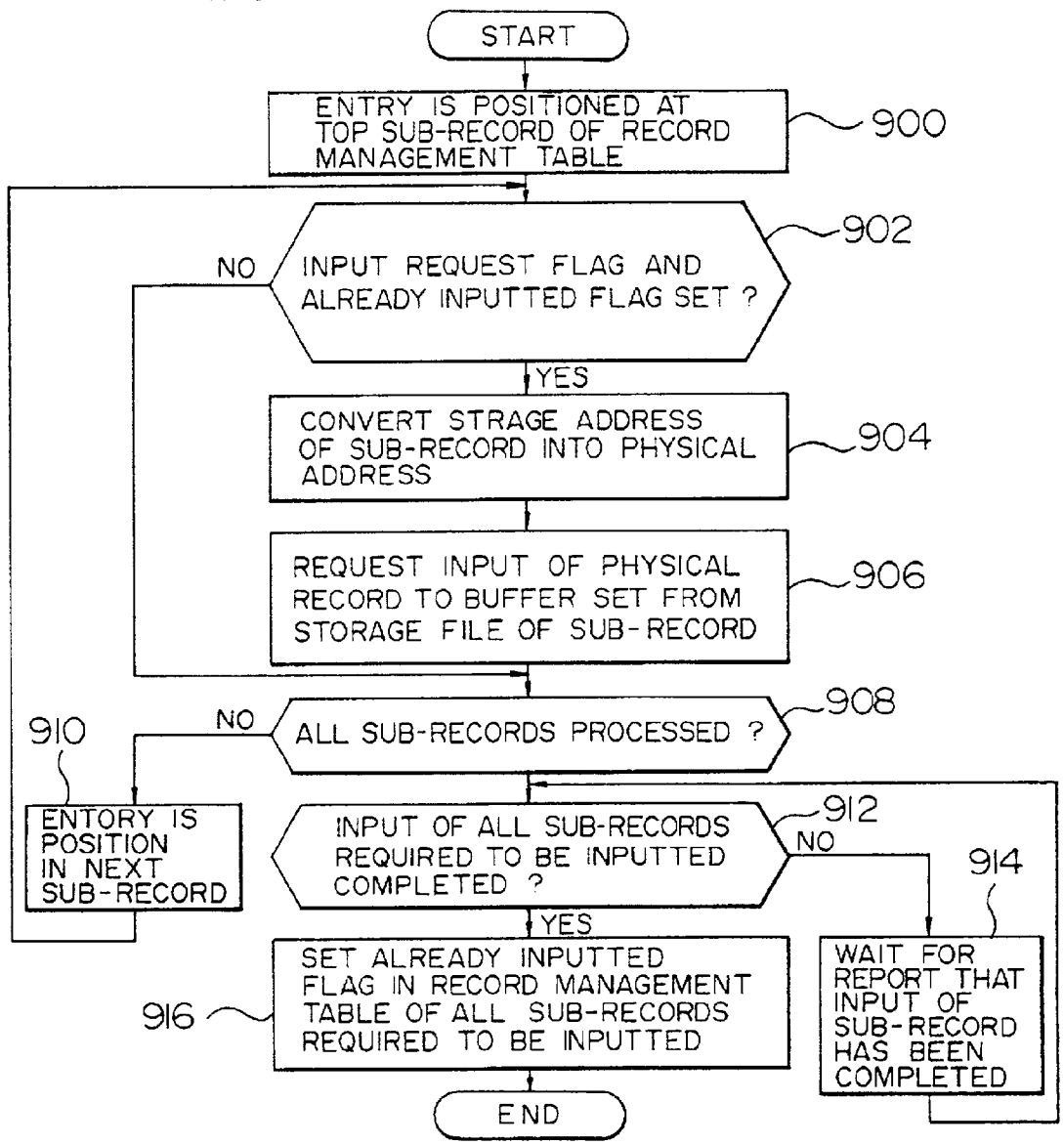
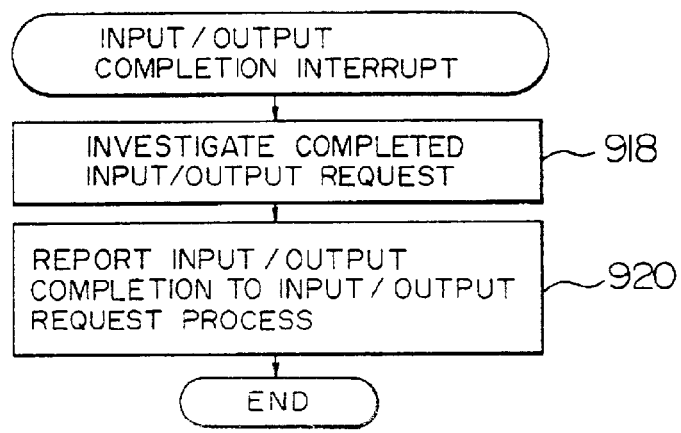

DATA PROCESSING METHOD USING RECORD DIVISION STORING SCHEME AND APPARATUS THEREFOR

This is a continuation application of U.S. Ser No. 09/324,731, filed Jun. 3, 1999 U.S. Pat. No. 6,216,203, which is a continuation application of U.S. Ser. No. 08/767,188, filed Dec. 17, 1996, now U.S. Pat. No. 5,943,683, which is a continuation application of U.S. Ser. No. 08/087,162, filed Jul. 2, 1993, now U.S. Pat. No. 5,586,292.

BACKGROUND OF THE INVENTION

The present invention relates to a file management system having a large capacity memory for storing long data, and more particularly to a data processing method and an apparatus therefor in a system for managing a multimedia data base, a map information data base and a knowledge data base in which character texts, figures and image data are stored.

In the system which handles long data such as character texts, figures and image data, since a logical record length of data is increased and an amount of data to be transferred between an input/output buffer set in a main memory in a central processing unit for processing sing data and an external memory unit for storing data is increased, a sufficient access performance is not obtained due to a limitation of a data transfer rate. Further, by repeating update, addition and deletion of expanded records, invalid areas are scatteringly formed in a file to thereby deteriorate a space efficiency of the file.

In this connection, JP-A-1-106217 discloses a technique that long data is divided and the divided data are stored in a plurality of secondary memory units in parallel. In this technique, the long data is divided to form divided files and information relative to memory locations of the divided files in the secondary memory units is stored in one of the divided files. When the long data is read out, the information relative to the memory location is read out from one of the divided files and the divided files in the secondary memory units indicated by the information are read out in parallel to restore the long data. When the data is updated, the restored data is updated and the updated data is divided again to store in the secondary memory units.

Further, JP-A-2-52305 discloses a partially updating method of image data in which in an image file apparatus for storing a document such as a drawing as an image file, an inputted document is divided into a predetermined number of divided image units to be stored and when any modification occurs in the document, only a divided image unit having contents which are to be modified is modified and stored again. In this technique, when the modification occurs, the whole image is not stored again and accordingly the image file can be updated at high speed.

SUMMARY OF THE INVENTION

The inventors have found the following problems as a result of studying the techniques in the prior arts.

In the former prior art technique, since data processing for all of the divided files is made in parallel, there is a problem in a speed of operation for processing only data of a portion of the divided files independently.

Further, the management of the input/output buffers and the improvement of operation speed thereof are not considered sufficiently. More particularly, the system must provide a large number of input/output buffers in the main memory in order to transfer data in parallel effectively. Since a record length of the multimedia data such as character texts, figures, images or the like is several hundred KB to several hundred MB, a main memory capacity required for input and output of one record is increased. Accordingly, when all of requests for record operation are made in unit of record, multi-processing of a plurality of requests for record operation is restricted by the main memory capacity and a time loss occurs due to waiting for an unoccupied input/output buffer, so that the throughput of the whole system is reduced.

In addition, in a retrieval instruction of record, only a partial item of data is used to make judgment of a retrieval condition which is made by reading data into the input/output buffer in the main memory, although all of data constituting the record is read in the buffer and accordingly useless reading of data having no relation to the retrieval condition is made in the case where the condition is not matched to thereby occupy the input/output buffer uselessly.

In the latter prior art technique, since only the image unit modified actually of the divided image units is recognized and stored again, input and comparison of correction data and unmodified data are necessary, so that useless input of image units having data not updated and useless occupation of the input/output buffer occur similarly.

Furthermore, in both of the prior art techniques, data to be handled is intended to be fixed length data, while handling of variable length data is not described. When the variable length data is divided simply in the same manner as in the prior art, there is the following problem.

When a length of divided sub-records is changed, the capacity of each of the divided files is varied and storage addresses such as physical addresses or relative byte addresses in a file storing the sub-records are also varied for each of the divided files. Accordingly, if the relation between the sub-records constituting one record is not established by holding a storage address of an actual value of a next corresponding sub-record in actual values of the sub-records, a random access to any record can not be made. On the other hand, when the relation between the sub-records is established, a storage address of the sub-record is not understood as far as a sub-record positioned just before the sub-record having a storage address is not inputted except the sub-record including an item which is a key for storage of the record and accordingly parallel input of sub-records can not be made.

On the contrary, when the records are of the variable length type and the records are divided to be stored in a plurality of files on condition of the maximum record length, an actual value of record having a short record length has no or less data to be stored in a rear divided file. Accordingly, actual values of sub-record having all or many useless areas are formed and the space efficiency of the rear divided file is deteriorated.

It is an object of the present invention to provide a data processing method and apparatus capable of processing long data effectively at high speed with minimum input/output process using a limited input/output buffer area.

It is a second object of the present invention to provide a data processing method capable of dividing long data into a plurality of sub-records to be stored and making operation of data in unit of sub-record.

It is a third object of the present invention to provide a data processing method capable of dividing variable length data into a plurality of sub-records effectively.

It is a fourth object of the present invention to provide a data processing method capable of dividing variable length data into a plurality of sub-records, storing the divided sub-records in a plurality of memory units dispersedly and accessing the stored data at high speed.

In order to achieve the above object, according to the present invention, a record constituting a unit of data operation is divided into a plurality of sub-records and the divided sub-records are stored in memory units, each capable of performing independent input and output process, in unit of sub-record. The number of sub-records necessary for required data operation is limited to the minimum and the data operation is performed in unit of one or more sub-records. The size of divided sub-records is desirably determined on the basis of unit of access to the memory unit for storing the sub-records. For example, when an external memory unit is a magnetic disk unit, access of data is controlled in accordance with a physical record length of the magnetic disk unit and accordingly if the size of divided sub-records is determined in accordance with the physical record length, recording/reproducing operation is made effectively at high speed.

The divided sub-records are stored in the memory units, each capable of performing independent input and output process, in unit of sub-record. It is desirable to store the plurality of sub-records in a plurality of memory units in parallel. The memory unit desirably uses an array type magnetic disk unit. Storing of sub-records can be made at higher speed by making storage addresses for the plurality of memory units identical. For example, when first to third sub-records are stored in three memory units, if storage addresses thereof are arranged properly so that the first sub-record is stored in a record #1 of the first memory unit, the second sub-record is stored in a record #1 of the second memory unit and the third sub-record is also stored in a record #1 of the third memory unit, the same physical addresses are desirably designated at the same time upon reading.

File definition information including configuration item information of record, information indicative of a division unit of sub-records and selection information indicative of a file of an external memory unit in which a divided sub-record is stored is registered or stored in, for example, an external memory unit and data processing is made with reference to the file definition information.

In the data processing method according to the present invention, by inputting and outputting all sub-records in parallel in the operation of a record divided and stored in unit of sub-record, data operation in unit of record can be attained. On the other hand, when the number of required sub-records is limited to small in accordance with the required data operation, an amount of input/output buffers required in the data operation and the number of input/output operations to the memory unit can be reduced as compared with the case where all sub-records are processed in unit of record.

In file definition information registration/reference means of the data processing apparatus according to the present invention, since the file definition information indicative of the relation of divided sub-records of the record and files corresponding to the divided sub-records is provided in a register or roster, the file definition information can be referred on the extension of the record operation instruction. Thus, parallel input/output of all sub-records as well as individual input/output of each of the sub-records can be made upon execution of the record operation instruction. Further, since a file in which each of the sub-records is stored can be selected arbitrarily, the external memory unit can be selected in accordance with the access characteristic of each of the sub-records such that the sub-record having high access frequency uses a semiconductor memory unit having high-speed input/output possibility, so that the performance of the whole system can be improved.

The above method is suitable for the case of the fixed length record, while the method for the variable length record is made as follows. That is, the record is divided into a fixed length portion and a variable length portion. The fixed length portion may be stored as described above. The variable length portion is further divided into different sub-records to be stored in the memory unit. Since the sub-record of the variable length portion has a length varied in accordance with data to be written, a data length can not be fixed. Accordingly, it is difficult to make identical the storage address with that of the memory unit for storing the fixed length sub-record. Thus, in the present invention, the physical address for storage of the variable length portion is not made identical with that of other sub-records and a pointer indicative of the storage address is stored in a portion of the fixed length sub-record to thereby designate a reading position of data in the variable length portion.

BRIEF DESCRIPTION OF THE DRAWINGS

FIG. 3 illustrates an example of a data structure of a record management table in the file management system of the embodiment;

FIG. 15 is a flow chart showing a procedure of a return process and a release process of the unit-of-sub-record input/output buffer management processing unit of the embodiment;

FIG. 17 is a flow chart showing a procedure of an input process of a unit-of-sub-record parallel input/output processing unit of the embodiment.

DESCRIPTION OF THE PREFERRED EMBODIMENT

An embodiment of the present invention is now described in detail with reference to the accompanying drawings.

Figure 1:
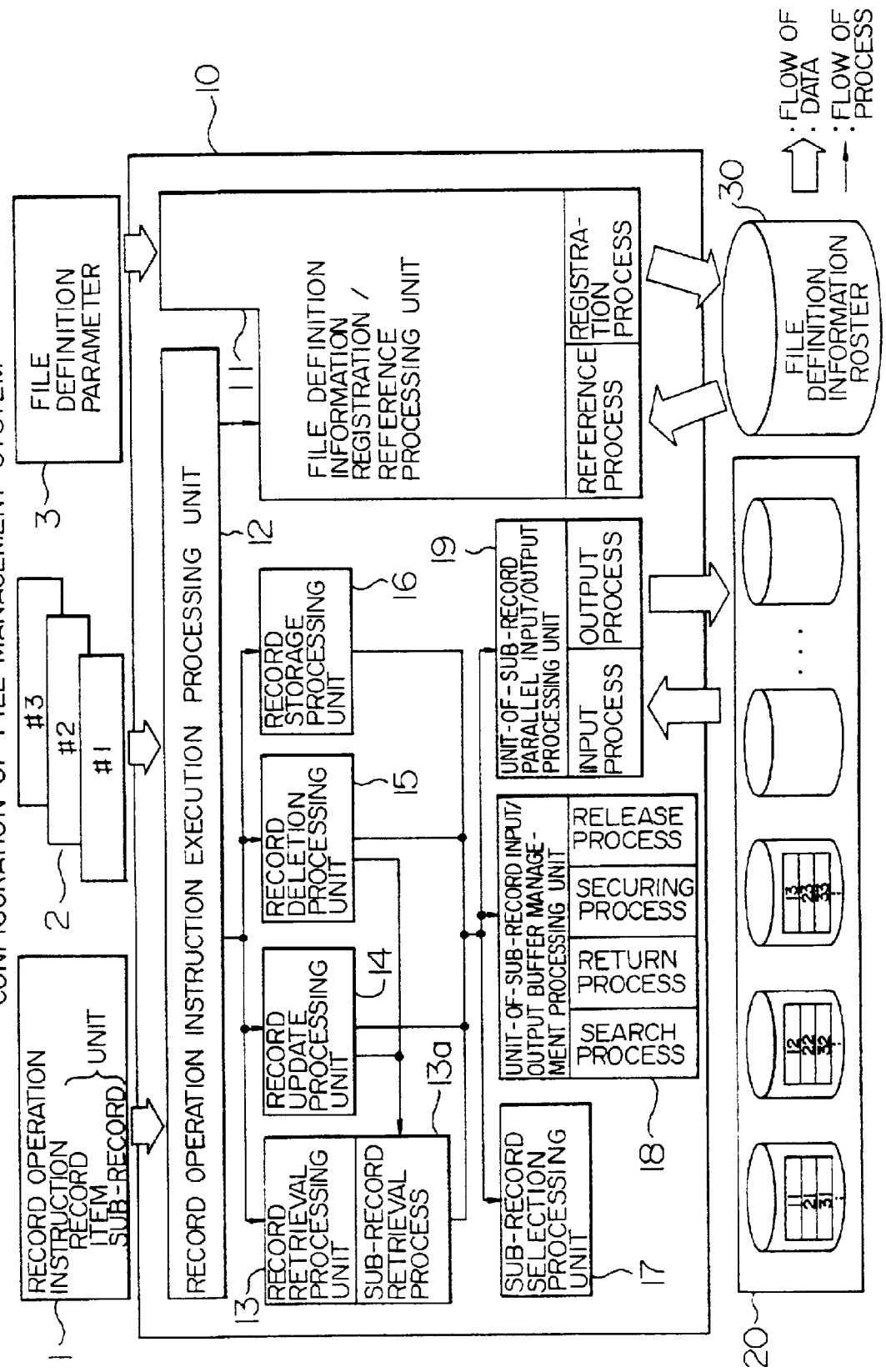
FIG. 1 is a schematic diagram illustrating a file management system according to an embodiment of the present invention.

FIG. 1 is a schematic diagram illustrating a file management system according to an embodiment of the present invention. The file management system 10 is to perform writing and reading processes of data 2 to an external memory unit 20, and divides long data to perform various processes such as retrieval, update, deletion and storage of data in unit of divided data (hereinafter referred to "sub-record"). The data 2 is to be stored in the external memory unit 20. In FIG. 1, three sets of data (#1, #2 and #3) are illustrated, while the file management system 10 can divide the data by a proper unit in accordance with the length of the given data and accordingly the length of the data 2 and the peculiar structure of a record are not an important problem. The external memory unit 20 is a memory unit for storing the data 2 and can use various memory units such as, for example, a magnetic disk unit, an optical disk unit and a magnetic tape unit. The external memory unit 20 includes a plurality of memory means capable of being accessed simultaneously and can desirably perform parallel transfer and parallel recording/reproducing of data.

A record operation instruction 1 is operation instructions such as retrieval, update, deletion and storage and is specified together with unit of process by a higher ranking apparatus, for example. A file definition parameter 3 is to indicate a situation of the data 2 to be stored in the external memory unit 20 and can specify a unit for dividing the data 2 into sub-records and a memory location of a file in the external memory unit 20 in which the data is stored. Information given by the file definition parameter 3 is registered in a file definition information roster 30 as file definition information.

The file management system 10 comprises a record operation instruction execution unit 12 for controlling analysis and execution of the record operation instruction 1, a record retrieval processing unit 13, a record update processing unit 14, a record deletion processing unit 15 and a record storage processing unit 16 responsive to a calling from the record operation instruction execution processing unit 12 for performing various record operations, a sub-record selection processing unit 17 for selecting a sub-record which is actually required for various record operations, a unit-of-sub-record input/output buffer management processing unit 18 for managing an input/output buffer required for input/output of the sub-record, a unit-of-sub-record parallel input/output processing unit 19 for performing input/output of data in unit of sub-record between the external memory unit 20 and the unit-of-sub-record parallel input/output processing unit 19, and a file definition information registration/reference processing unit 11 for analyzing and editing the file definition parameter 3 to register it in the file definition information roster 30 and capable of referring to the necessary file definition information in response to calling from the record operation instruction execution processing unit 12.

The sub-record selection processing unit 17 automatically selects the minimum sub-record required for record operation on the basis of the file definition information when the unit of operation of the offered record operation instruction is a unit of item or a unit of sub-record. The record retrieval processing unit 13 further includes a sub-record retrieval process 13a which is also called commonly from the record update processing unit 14 and the record deletion processing unit 15. In addition, the unit-of-sub-record input/output buffer management processing unit 18 is divided into four processes including search process, return process, securing process and release process, the unit-of-sub-record parallel input/output processing unit 19 is divided into two processes including input process and output process, and the file definition information registration/reference processing unit 11 is divided into two processes including reference process and registration process.

Figure 2:
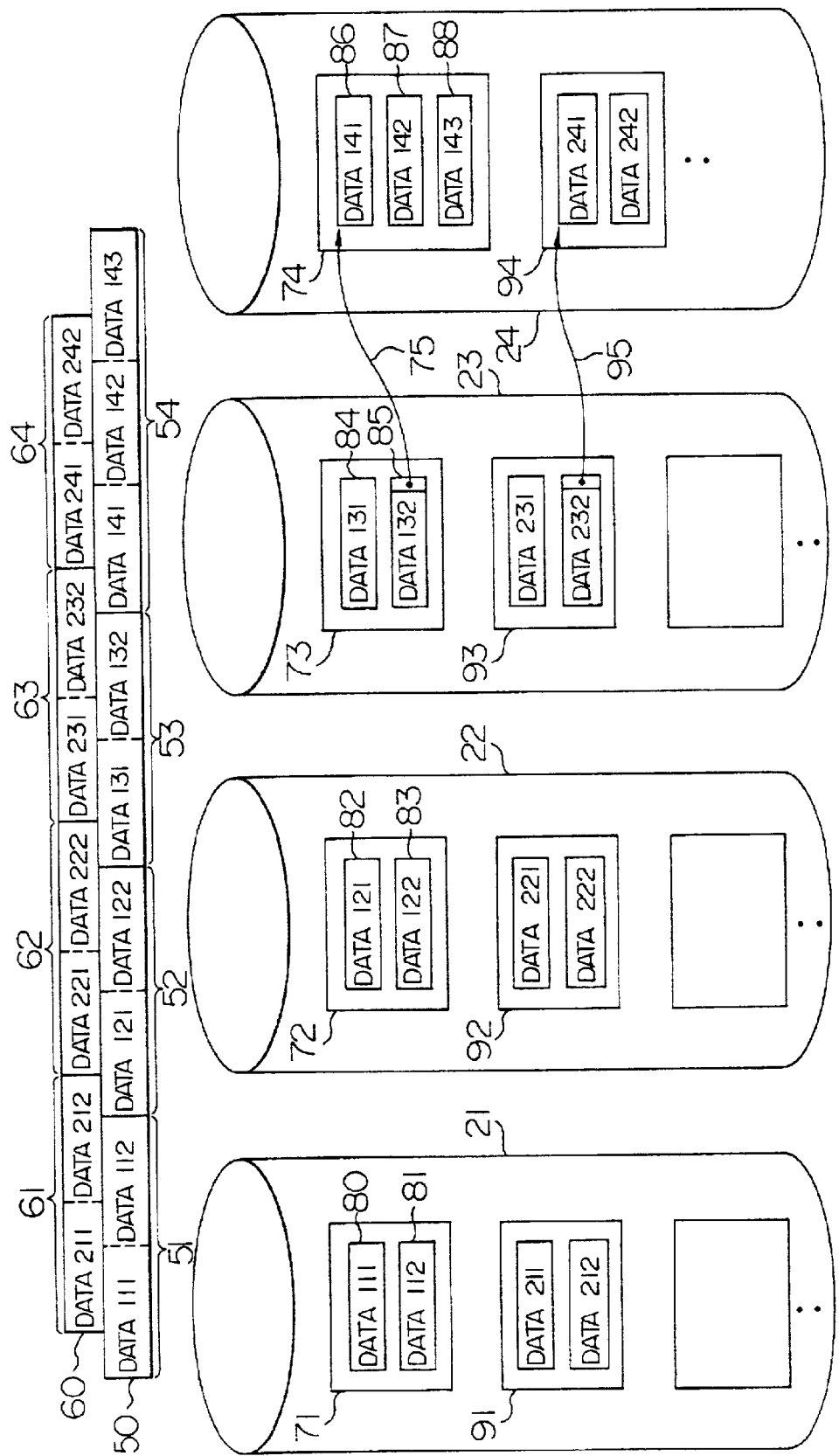
FIG. 2 illustrates an example of a data storage method in the file management system of the embodiment.

FIG. 2 illustrates an example of a data storage method in the file management system according to the embodiment. A logical record data 50 includes a portion constituted by fixed length information (sub-records 51, 52 and 53) and a portion constituted by variable length information (sub-record 54). The four sub-records 51, 52, 53 and 54 are stored in area 71, 72, 73 and 74 in external memory units 21, 22, 23 and 24 capable of performing input/output operation in parallel, respectively. Management of the storage is desirably made in accordance with a physical record length which is a unit of physical input/output of the external memory unit. For example, the sub-record 51 is stored in physical records 81 and 82 of the area 71. It is desirable that the physical records 81 and 82 are set to be physically continuous records so as to increase a reading speed. Similarly, the areas 72, 73 and 74 include physically continuous records 82 and 83, 84 and 85, and 86, 87 and 88, respectively. The physically continuous area corresponds to one cylinder of a magnetic disk unit, for example, and represents an area in which continuous input/output of the physical records in the area is made mechanically at high speed.

Since the sub-records 51, 52 and 53 are fixed length data, the physically continuous areas 71, 72 and 73 have a physically equal length and the sub-records are stored in the same physical address. In other words, the physical records 80 and 81 are assigned to first and second cylinders of the external memory unit 21, respectively. Similarly, the physical records 82 and 83 are assigned to first and second cylinders of the external memory unit 22, respectively. Further, the physical records 84 and 85 are assigned to first and second cylinders of the external memory unit 23, respectively. Thus, by arranging the physical addresses for storage in this manner, when the external memory units 22 to 23 are constituted by disk units rotated in synchronism with each other, operation speed is improved remarkably.

On the contrary, the sub-record 54 is a variable length data portion, and physical length and physical address of the area 74 are not necessarily identical with those of the areas 71, 72 and 73. This reason is that the sub-record 54 of the logical record data 50 includes three units of data 141 to 143 while the number of units is increased or decreased depending on data to be handled. Accordingly, a pointer 75 indicative of a storage address of the physical record 86 of the area 74 in which the sub-record 54 of the variable portion is stored is set in the physical record 85 of the area 73 in which the final sub-record of the fixed portion is stored, to thereby form correspondence between the sub-records.

Similarly, the logic record data 60 is also divided into fixed length sub-records 61, 62 and 63 and a variable length sub-record 64, which are stored in areas 91, 92, 93 and 94 of the external memory units 21, 22, 23 and 24 capable of performing input/output operation in parallel, respectively. A pointer 95 indicative of an address of the variable length sub-record 64 in the external memory unit 24 is set in the area 93, so that the fixed length data portion (fixed portion) of the logical record data 60 corresponds to the variable length data portion (variable portion) thereof.

Operation of the file management system 10 of FIG. 1 is now described.

When the file definition information registration/reference processing unit 11 registers the file definition information, a designated file definition parameter 3 is supplied to the file definition information registration/reference processing unit 11. The file definition parameter 3 includes information such as a record name, a fixed/variable length type, a record length/maximum record length, sub-record names, a sub-record length and sub-record storage file names. The inputted information is edited by the file definition information registration/reference processing unit 11 and is registered in the file definition information roster 30 in the data format shown in FIG. 3.

In FIG. 3, a record management table 45 includes a header portion 46 having information relative to the whole data (record) and an entry portion 47 having information relative to divided sub-records. The entry portion 47 is arranged in an array including entries the number of which is equal to that of sub-records constituting the record.

Figure 4:
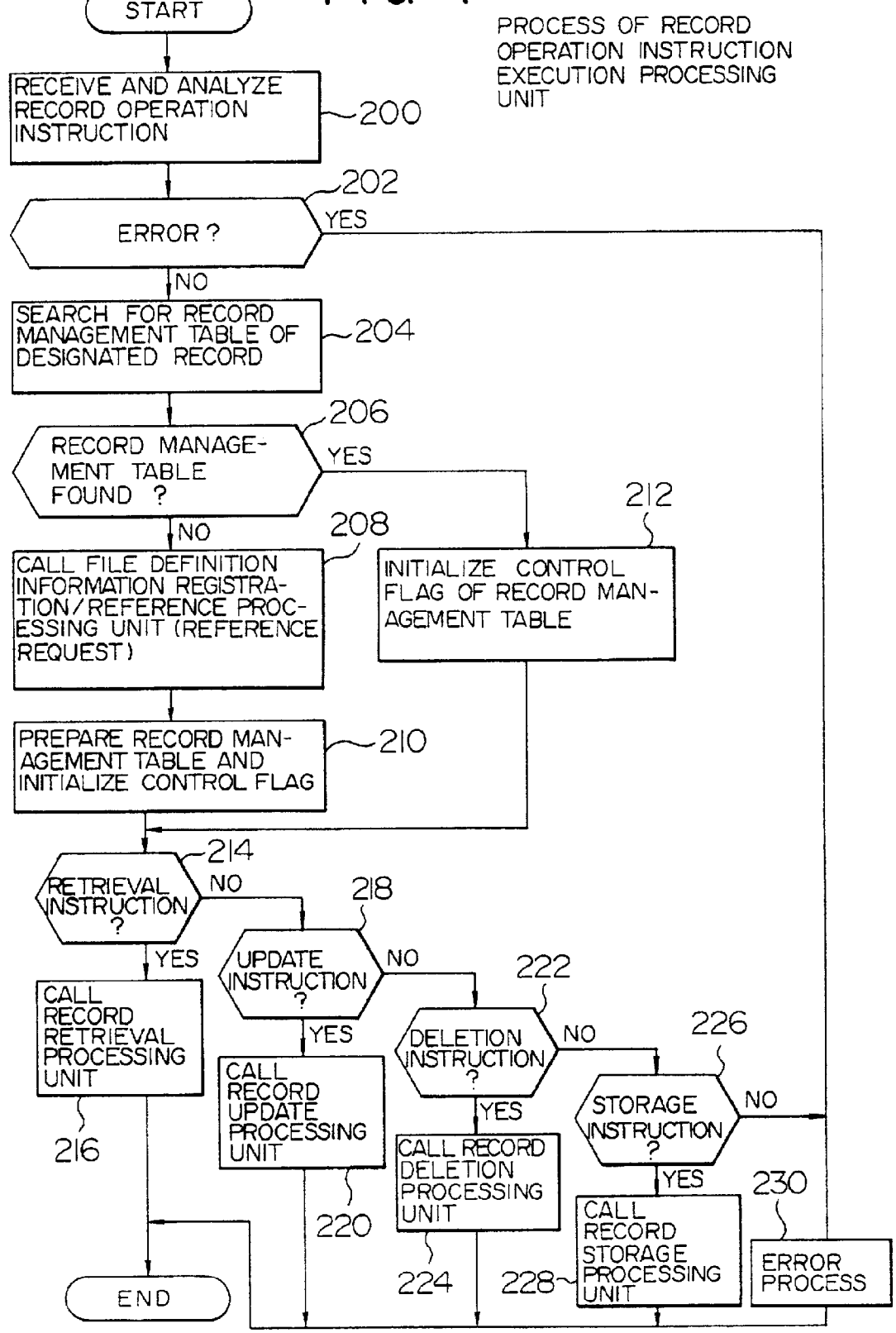
FIG. 4 is a flow chart showing a process of a record operation instruction execution processing unit of the embodiment.

Referring now to FIG. 4, operation of the record operation instruction execution processing unit 12 is described. When the record operation instruction 1 is inputted, the record operation instruction execution processing unit 12 receives the record operation instruction and analyzes it (step 200). If there is any error, an error process is made (steps 202 and 230) and an error report is sent to a request source. If there is no error, whether the record management table 45 for a designated record has been prepared in the memory or not is judged (step 204). If the record management table is not found in the memory (step 206), the file definition information registration/reference processing unit 11 is called by reference request (step 208) and the record management table 45 of the file definition information is loaded in the memory to initialize the management flags 48 of all of the sub-records (step 210). When the record management table 45 has been already loaded in the memory, only the initialization of the management flags 48 of all of the sub-records of the record management table 45 is made (steps 206 and 212).

The designated record operation instruction is now analyzed. When it is a retrieval instruction, the record retrieval processing unit 13 is called (steps 214 and 216). When it is an update instruction, the record update processing unit 14 is called (steps 218 and 220). When it is a deletion instruction, the record deletion processing unit 15 is called (steps 222 and 224). When it is a storage instruction, the record storage processing unit 16 is called (steps 226 and 228). When it is an instruction other than the above, the error process is made (step 230) and an error report is sent to the request source. The above processes are described later.

Figure 5:
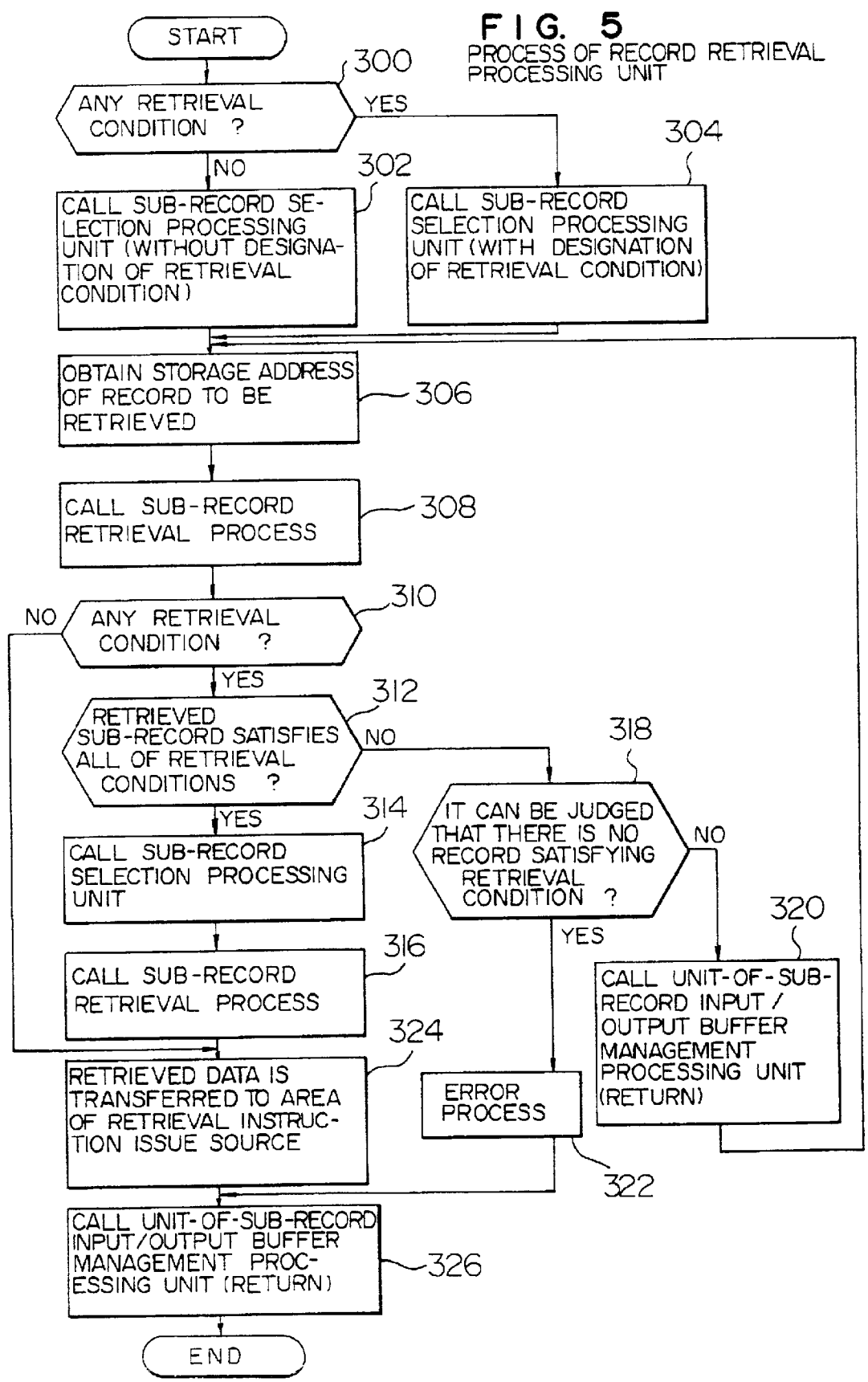
FIG. 5 is a flow chart showing a process of a record retrieval processing unit of the embodiment.

Referring now to FIG. 5, operation of the record retrieval processing unit 13 is described. The record retrieval processing unit 13 judges whether a retrieval condition is provided in the designated record operation instruction 1 or not (step 300). When the retrieval condition is not provided, the sub-record selection processing unit 17 is called without designation of the retrieval condition (step 302). Further, when the retrieval condition is provided, the sub-record selection processing unit 17 is called with designation of the retrieval condition (step 304) and a sub-record requiring the retrieval is determined.

A storage address of the record to be retrieved is obtained in accordance with a key item of the retrieval condition, a relation of the record to be retrieved to a record which has been retrieved just before or a storage location of a top record (step 306). Then, the sub-record retrieval process 13a is called (step 308) to retrieve the sub-record. As a method of obtaining the storage address of the record to be retrieved in accordance with the key item of the retrieval condition, there is a method that an index is added to the key item and an index record portion is binary-searched or correspondence of the key item and the record storage address is calculated by the hash function.

In the retrieval of the sub-record by the above sub-record retrieval process 13a, if there is the retrieval condition (step 310), whether the retrieved sub-record satisfies all of the retrieval conditions or not is judged (step 312). When it can not be judged in accordance with the retrieval condition that there is no record satisfying the retrieval condition (step 318), the unit-of-sub-record input/output buffer management processing unit 18 is called by return request (step 320) and after the buffer is returned once, the processes subsequent to the step 306 are repeated.

When it can be judged in accordance with a single condition of the key item that there is no record satisfying the retrieval condition (step 318), an error process is made (step 322). Then, the unit-of-sub-record input/output buffer management processing unit 18 is called by return request (step 326) and after the buffer is returned, an error report is sent to the request source. When the retrieved sub-record satisfies all of the retrieval conditions (step 312), the sub-record selection processing unit 17 is called without designation of the retrieval condition (step 314) and the sub-record which is not required for judgment of the retrieval condition is also selected. The sub-record retrieval process 13a is called (step 316) to perform the retrieval.

When there is no retrieval condition in step 310 and when the record satisfying the retrieval condition is not found in step 312 and subsequent steps, the retrieved data is transferred to an area of the record retrieval instruction issue source (step 324). The unit-of-sub-record input/output buffer management processing unit 18 is then called by return request (step 326) and the buffer is returned to finish the process.

Figure 6:
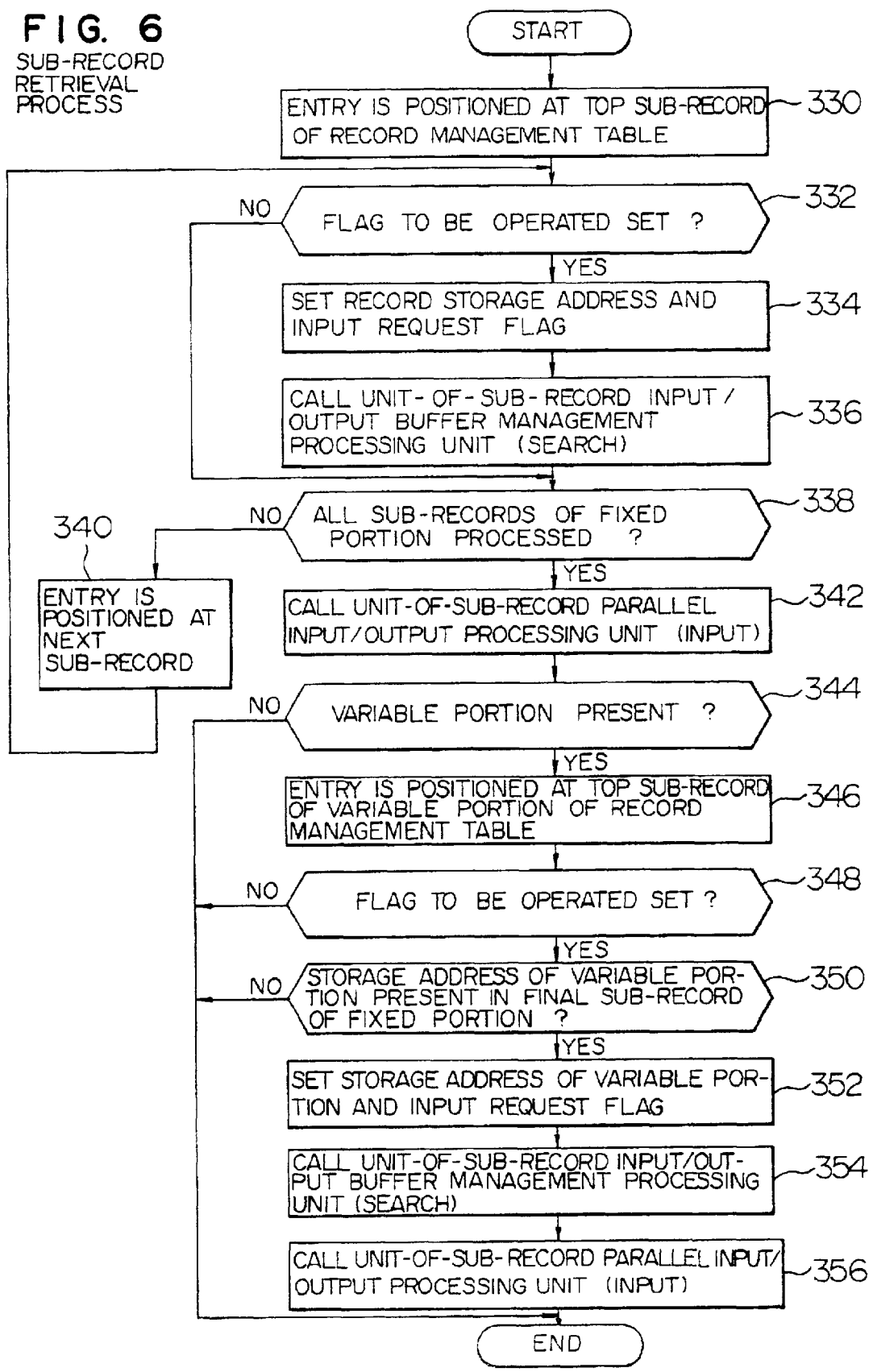
FIG. 6 is a flow chart showing a process of a sub-record retrieval process of the embodiment.

Referring now to FIG. 6, operation of the sub-record retrieval process 13a is described.

In this operation, first of all, an entry is positioned at the top sub-record of the record management table 45 (step 330) and whether a flag to be operated is set or not is judged (step 332). When the flag to be operated is set, the storage address of the record to be retrieved and the input request flag are set to retrieve the sub-record (step 334). The unit-of-sub-record input/output buffer management processing unit 18 is called by search request (step 336) and whether the sub-record has been already inputted in the buffer or not is judged. When the flag to be operated is not set, any operation is not made.

The above processes from steps 332 to 336 are repeated for all sub-record entries of the fixed portion of the record management table 45 (steps 338 and 340). Then, in order to read all sub-records required by the fixed portion, the unit-of-sub-record parallel input/output processing unit 19 is called by input request (step 342). Whether there is the variable portion for definition of the record or not judged (step 344), and when there is no variable portion, the process is finished.

On the other hand, when there is the variable portion, an entry is positioned at the top sub-record of the variable portion of the record management table 45 (step 346) and whether the flag to be operated is set or not is judged (step 348). When the flag to be operated is not set, the process is finished, while when the flag is set, whether a storage address of the variable portion is present in the final sub-record of the fixed portion or not is judged (step 350).

When the storage address of the variable portion is not present, the process is finished, while when the storage address of the variable portion is present, the storage address is set in a storage address of the sub-record entry of the variable portion and an input request flag is set (step 352). The same operation is also made to the sub-record of the variable portion in the same manner as in the fixed portion. That is, the unit-of-sub-record input/output buffer management processing unit 18 is called by search request (step 354) and whether the sub-record has been already inputted in the buffer or not is judged. Then, the unit-of-sub-record parallel input/output processing unit 19 is called by input request (step 356) to read out the sub-record and the process is finished.

Figure 7:
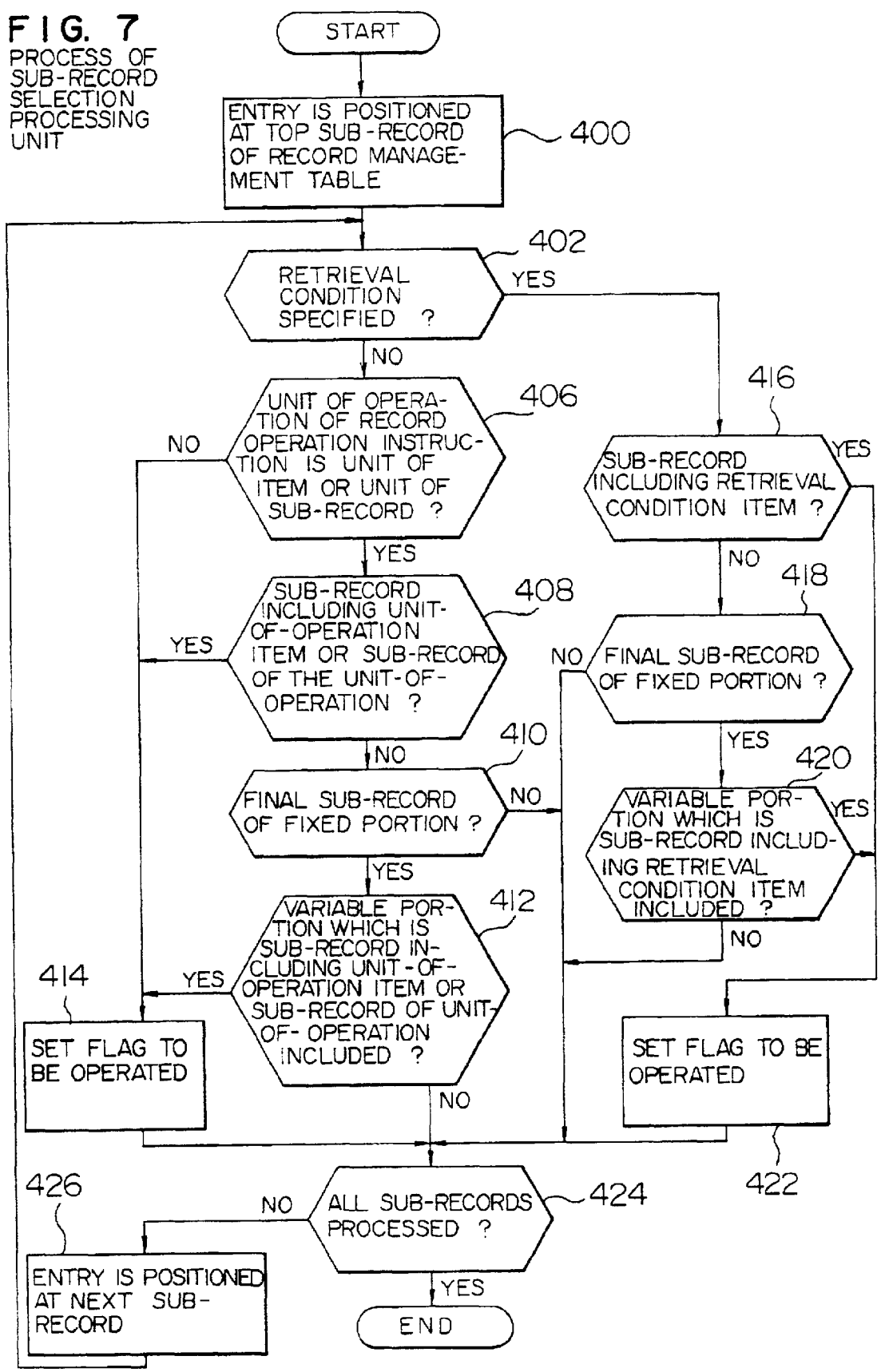
FIG. 7 is a flow chart showing a process of a sub-record selection processing unit of the embodiment.

Referring now to FIG. 7, operation of the sub-record selection processing unit 17 is described.

In this operation, an entry is positioned at the top sub-record of the record management table 45 (step 400) and the following process is repeated for all of the sub-record entries of the record management table 45 (steps 424 and 426). When the request does not specify the retrieval condition (step 402), whether a unit of operation of the record operation instruction is a unit of item or a unit of sub-record is judged (step 406). When it is neither the unit of item nor the unit of sub-record, that is, when it is a unit of record, the flag to be operated is set in the sub-record entry (step 414).

When the unit of operation of the record operation instruction is the unit of item or the unit of sub-record, whether the sub-record is a sub-record including the unit-of-operation item or a sub-record of the unit-of-operation is judged (step 408) and when it is the sub-record including the unit-of-operation item or the sub-record of the unit-of-operation, the flag to be operated is set in the sub-record entry (step 414).

When it is neither the sub-record including the unit-of-operation item nor the sub-record of the unit-of-operation, whether the sub-record is the final sub-record of the fixed portion or not is judged (step 410). When it is the final sub-record of the fixed portion and includes the variable portion which is a sub-record including the unit-of-operation item or a sub-record of the unit-of-operation, the flag to be operated is also set in the final sub-record entry of the fixed portion (step 414).

Then, when the request specifies the retrieval condition (step 402), whether the sub-record is a sub-record including the retrieval condition item or not is judged (step 416). When it is the sub-record including the retrieval condition item, the flag to be operated is set in the sub-record entry (step 422). When it is not the sub-record including the retrieval condition item, whether it is the final sub-record of the fixed portion or not judged (step 418). When it is the final sub-record of the fixed portion and includes the variable portion which is a sub-record including the retrieval condition item (step 420), the flag to be operated is set in the sub-record entry (step 422). When the above process is made for all sub-record entries of the record (step 424), the process is finished.

Figure 8:
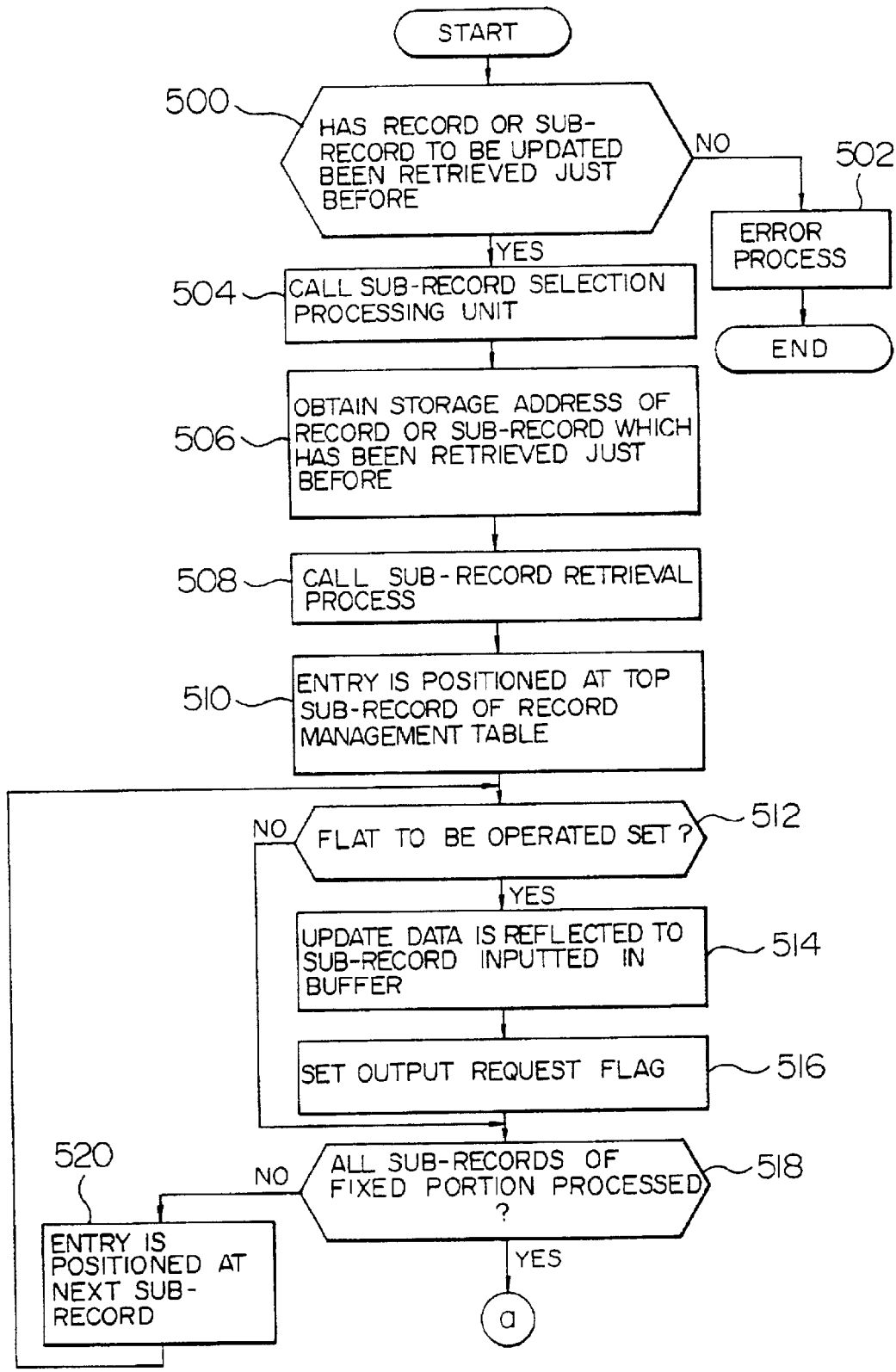
FIG. 8 is a flow chart (part 1) showing a process of a record update processing unit of the embodiment.
Figure 9:
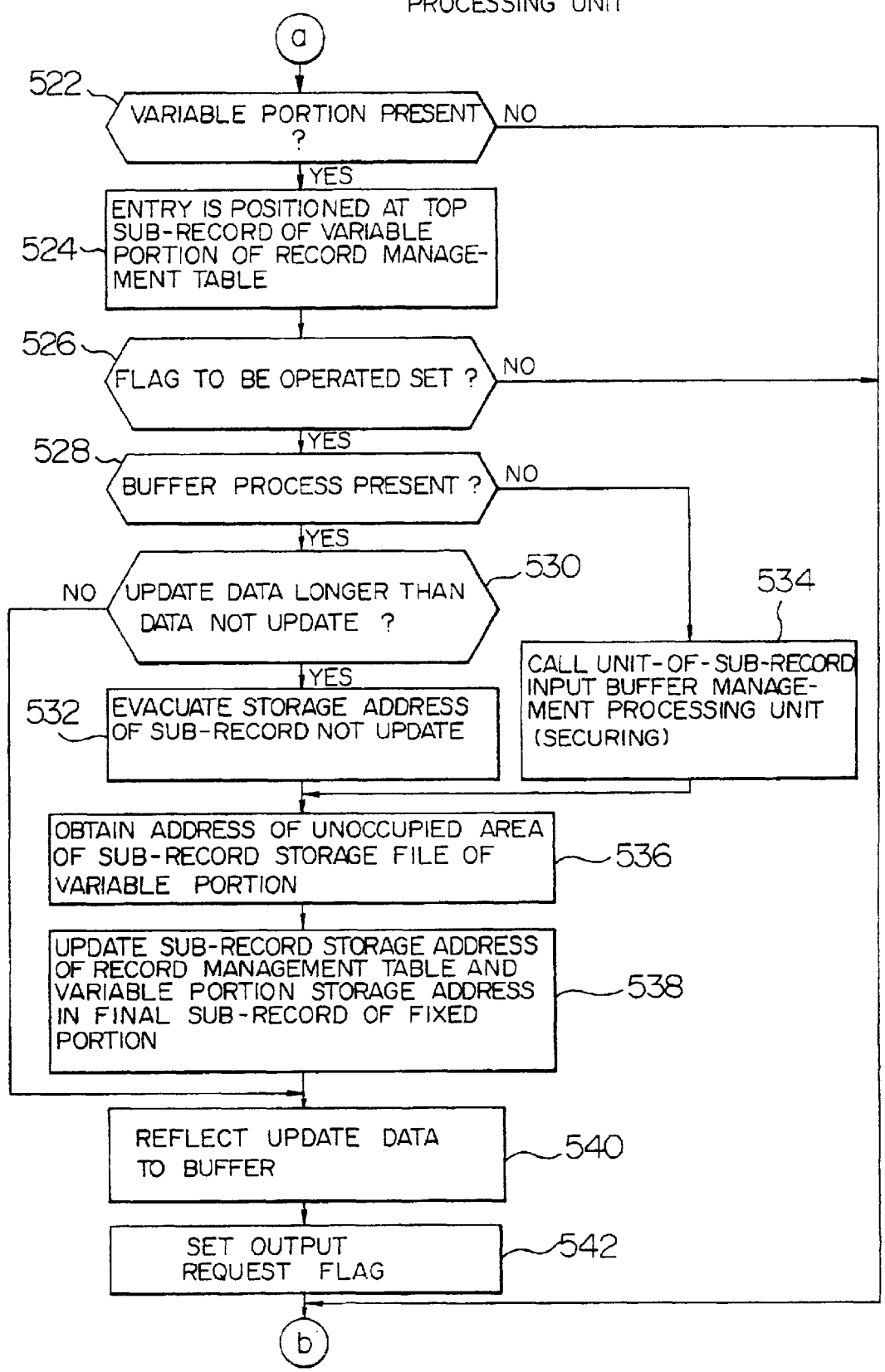
FIG. 9 is a flow chart (part 2) showing a process of the record update processing unit of the embodiment.
Figure 10:
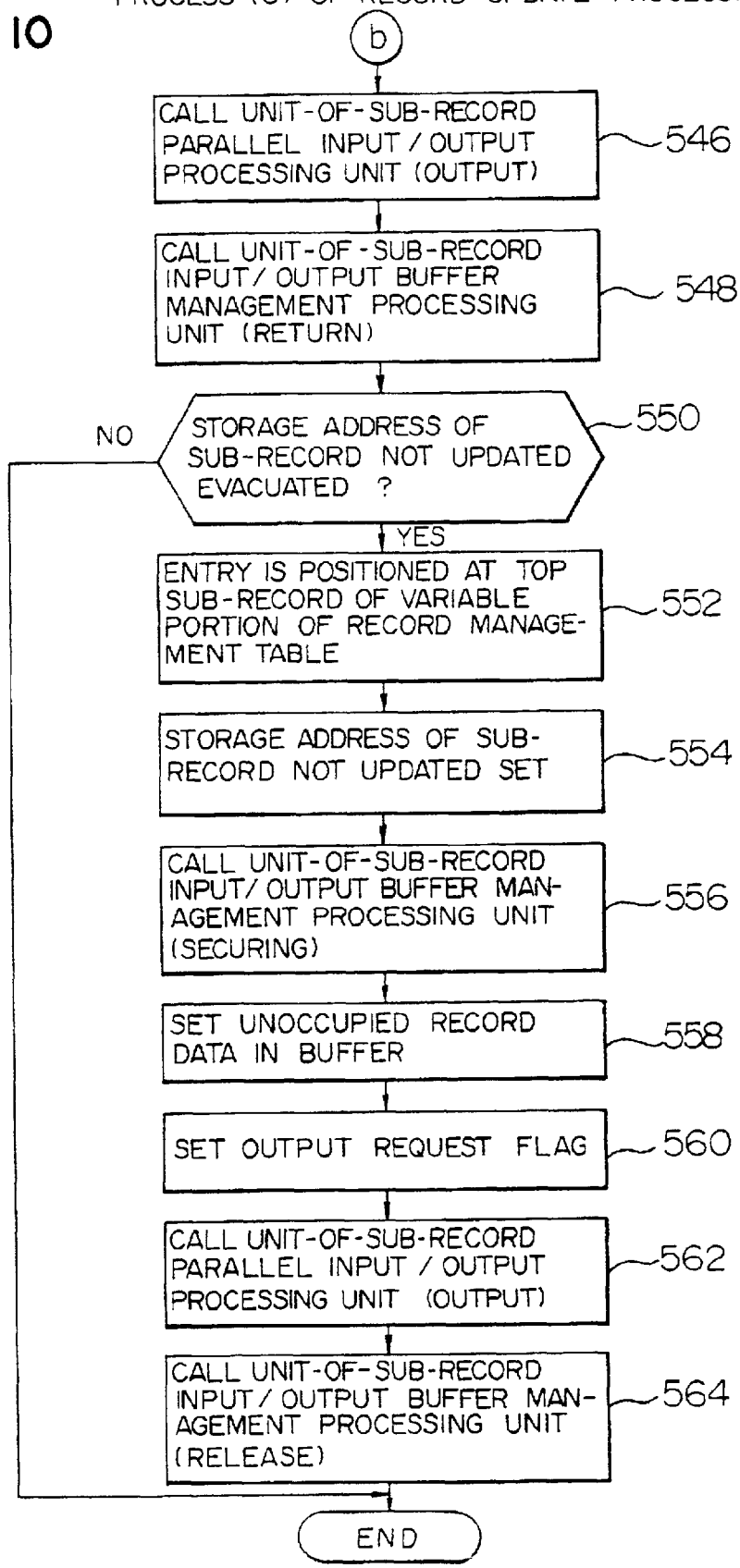
FIG. 10 is a flow chart (part 3) showing a process of the record update processing unit of the embodiment.

Referring now to FIGS. 8 to 10, operation of the record update processing unit 14 is described.

First of all, whether the record or sub-record to be updated has been retrieved just before or not is judged (step 500). When it has not been retrieved, an error process is made (step 502) and an error report is sent to a request source.

When it has been retrieved, the sub-record selection processing unit 17 is called and the sub-record to be updated is selected (step 504). A storage address of the record or sub-record which has been retrieved just before is obtained (step 506) and the sub-record retrieval process 13a is called (step 508) to retrieve all of sub-records to be retrieved.

Subsequently, an entry is positioned at the top sub-record of the record management table 45 (step 510). With respect to all sub-record entries of the fixed portion, when the flag to be operated is set (step 512), update data is reflected to the sub-record inputted in the buffer (step 514) and the process of setting the output request flag (step 516) is repeated for all sub-records of the fixed portion (steps 518 and 520).

Then, whether there is a variable portion or not is judged (step 522). When there is the variable portion, an entry is positioned at the top sub-record of the variable portion of the record management table 45 (step 524) and the process peculiar to the variable portion is made as follows.

When the flag to be operated is set in the sub-record of the variable portion (step 526) and the buffer address is present (step 528), whether the update data is longer than data which is not updated and inputted in the buffer or not is judged (step 530). When it is longer, the storage address of the sub-record of the data not updated is evacuated (step 532).

On the other hand, when the buffer address is not set (step 528), the unit-of-sub-record input/output buffer management processing unit 18 is called by securing request (step 534) to secure the output buffer of the update data. An address of an unoccupied area of the sub-record storage file of the variable portion is obtained as a new storage location of the sub-record of the variable portion (step 536). The storage address of the sub-record entry and the storage address of the variable portion in the final sub-record of the fixed portion are updated by the address of the unoccupied area (step 538).

When the update data is shorter than data not updated (step 530), it is not necessary to update the storage address. Then, the update data is reflected to the buffer (step 540) and the output request flag is set (step 542). After completion of the process peculiar to the variable portion and when there is no variable portion (step 522), the unit-of-sub-record parallel input/output processing unit 19 is called by output request (step 546) and the update data is outputted. The unit-of sub-record input/output buffer management processing unit 18 is called by return request (step 548) and the data is left on the input/output buffer.

Then, whether the storage address of the sub-record not updated which is evacuated at step 532 is present or not is judged (step 550). When it is not evacuated, the process is finished. When it has been evacuated, an entry is positioned at the top sub-record of the variable portion of the record management table 45 (step 552) and the storage address of the sub-record not updated which has been evacuated is set as a storage address of the sub-record entry (step 554).

Then, the unit-of-sub-record input/output buffer management processing unit 18 is called by securing request (step 556) and the buffer is secured. Further, an unoccupied record data is set (step 558) and the output request flag is set (step 560). The unit-of sub-record parallel input/output processing unit 19 is called by output request (step 562) and the area in which the sub-record not updated has been stored is made unoccupied.

Further, the unit-of-sub-record input/output buffer management processing unit 18 is called by release request (step 564) to release the buffer and the process is finished.

Figure 11:
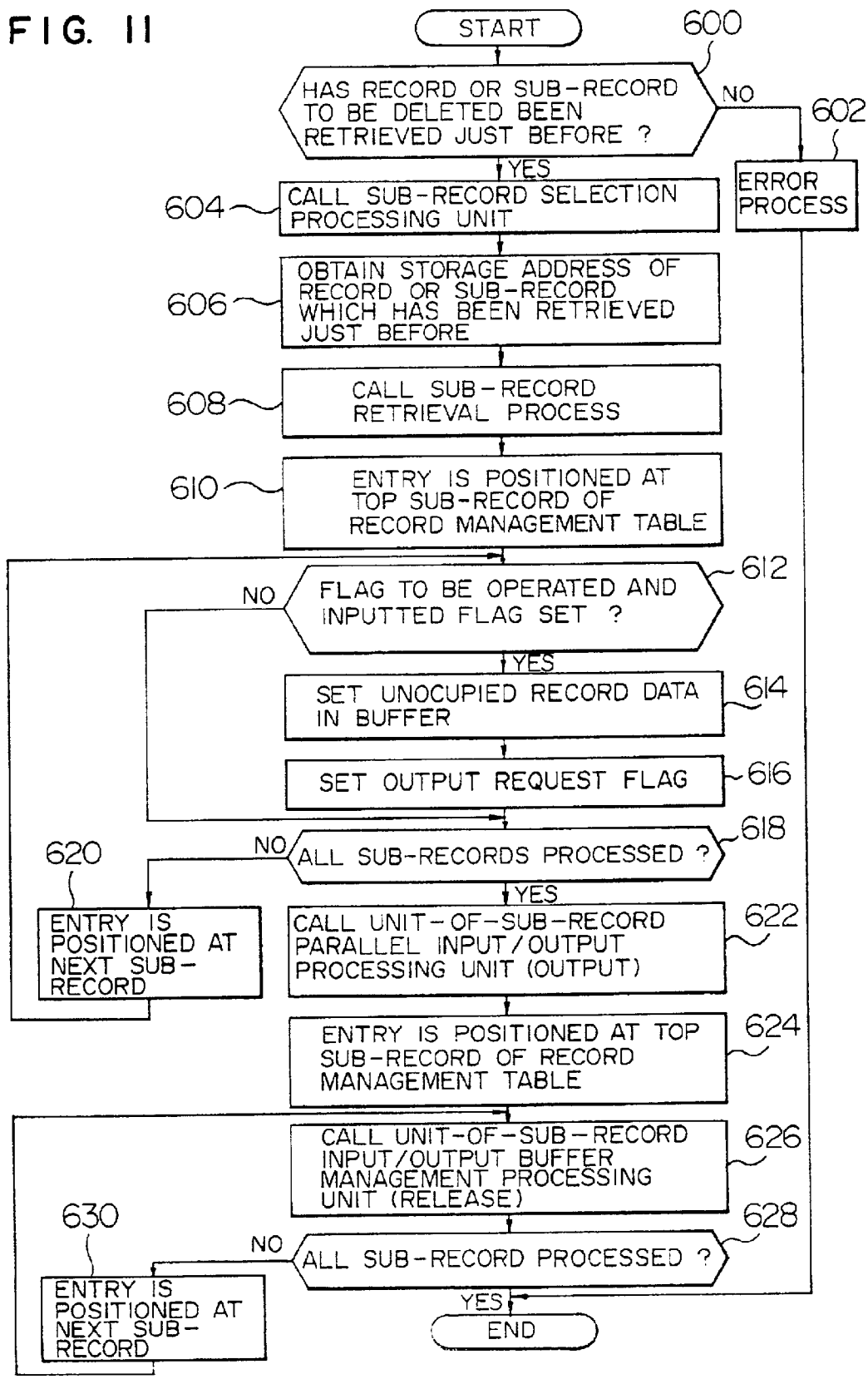
FIG. 11 is a flow chart showing a process of a record deletion processing unit of the embodiment.

Referring now to FIG. 11, operation of the record deletion processing unit 15 is described.

First of all, whether the record or sub-record to be deleted has been retrieved just before is judged (step 600). When it has not been retrieved, an error process is made (step 602) and an error report is sent to the request source. When it has been retrieved, the sub-record selection processing unit 17 is called (step 604) and the sub-record to be updated is selected. The storage address of the record or sub-record which has been retrieved just before is obtained (step 606) and the sub-record retrieval process 13a is called (step 608) to retrieve all of sub-records to be deleted.

Then, an entry is positioned at the top sub-record of the record management table 45 (step 610). When the flag to be operated and the inputted flag are set with respect to all of sub-record entries (step 612), the unoccupied record data is reflected to the sub-record inputted in the buffer (step 614) and the process of setting the output request flag (step 616) is repeated (steps 618 and 620). Then, the unit-of-sub-record parallel input/output processing unit 19 is called by output request (step 622) and unoccupied record data is produced in all of sub-records to be deleted to thereby delete the record.

Finally, an entry is positioned at the top sub-record of the record management table 45 again (step 624). Further, with respect to all of sub-record entries, the unit-of-sub-record input/output buffer management processing unit 18 is called by release request (step 626) and after the process of releasing the buffer is repeated (steps 628 and 630), the process is finished.

Figure 12:
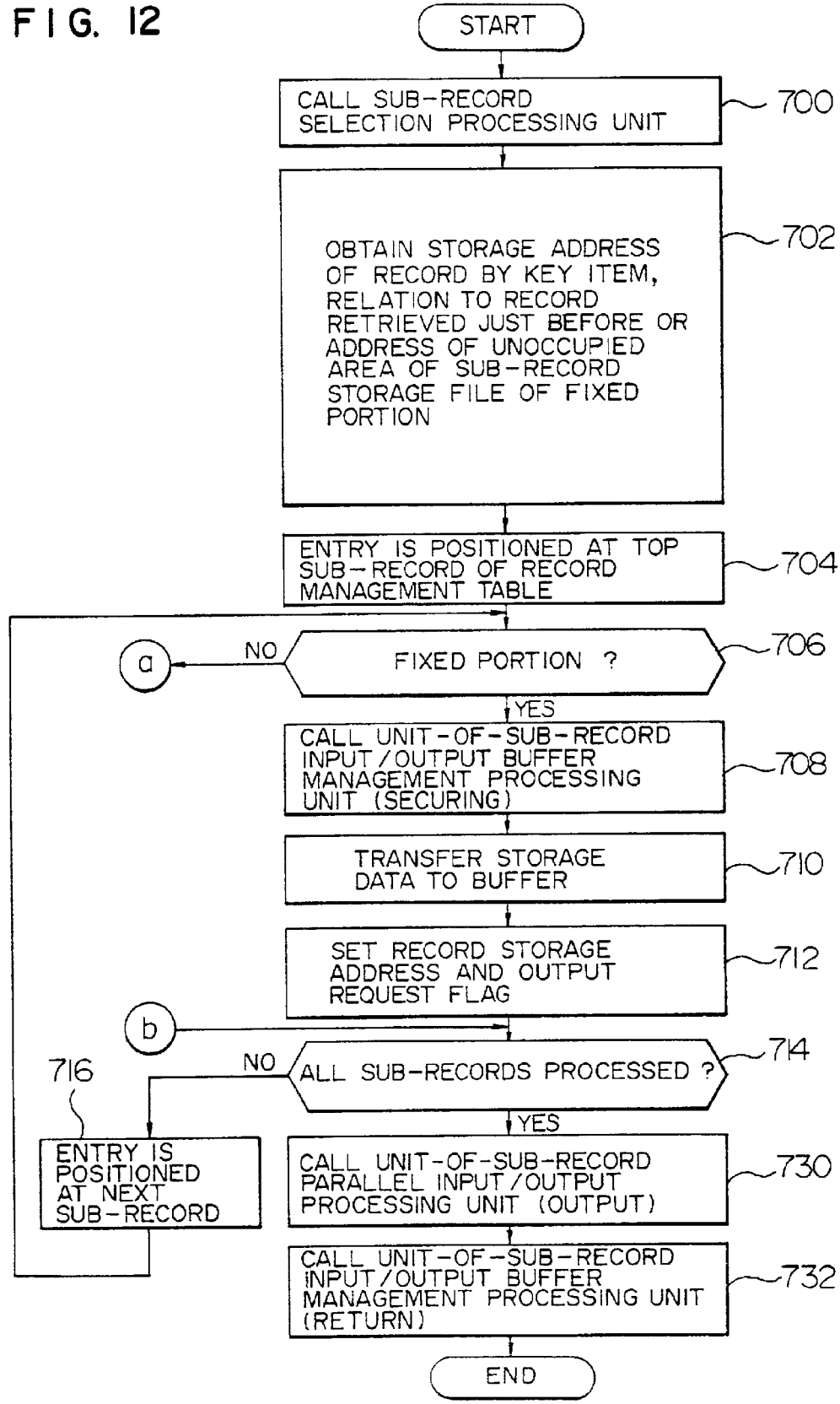
FIG. 12 is a flow chart (part 1) showing a process of a record storage processing unit of the embodiment.
Figure 13:
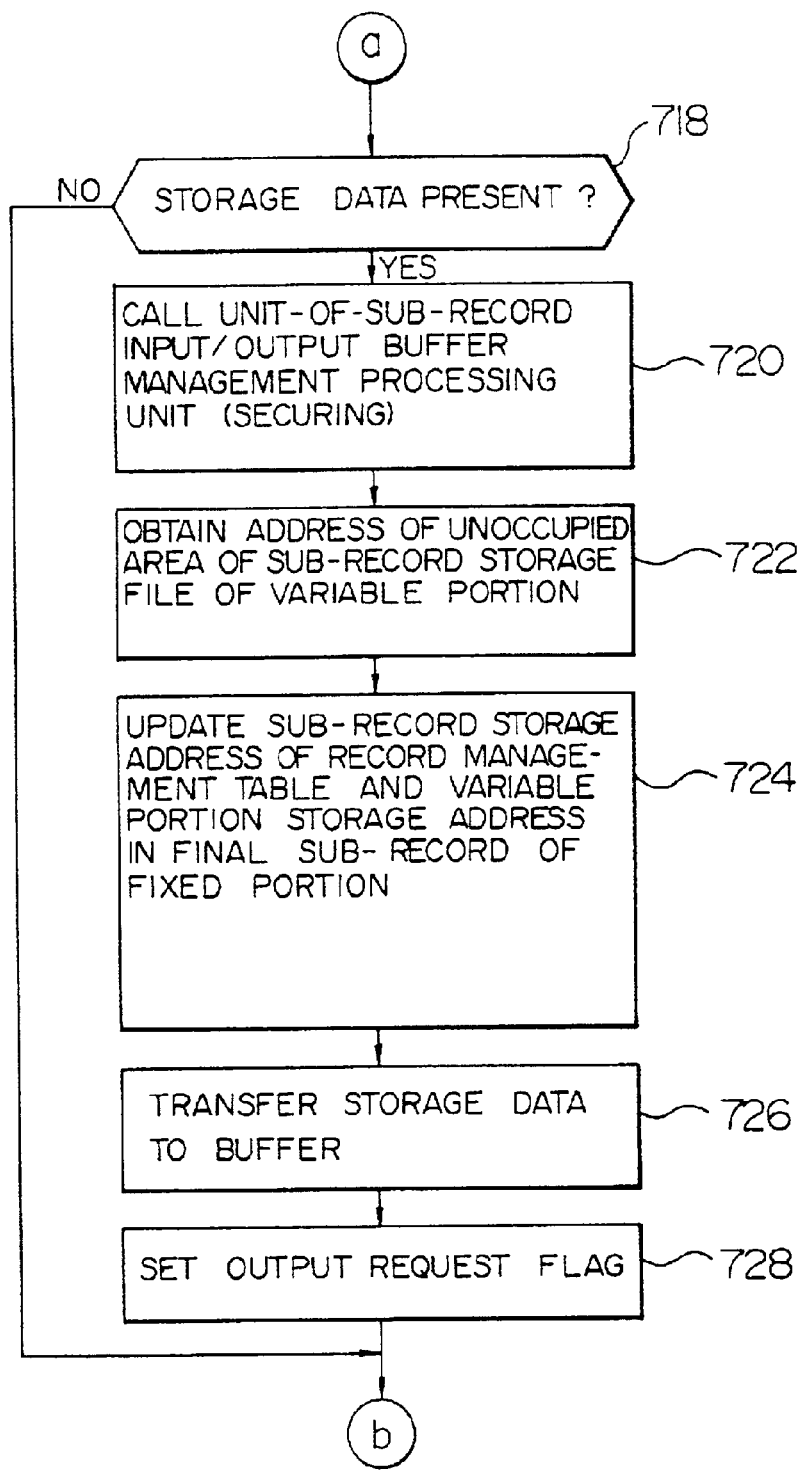
FIG. 13 is a flow chart (part 2) showing a process of the record storage processing unit of the embodiment.

Referring now to FIGS. 12 and 13, operation of the record storage processing unit 16 is described.

First of all, the sub-record selection processing unit 17 is called (step 700) and the storage address of the record is obtained for all of sub-records on the basis of the key item, a relation of the record to a record which has been retrieved just before or an address of an unoccupied area of the sub-record storage file of the fixed portion (step 702). Then, an entry is positioned at the top sub-record of the record management table 45 and the following process is repeated for all of sub-record entries (steps 714 and 716).

When the sub-record is the fixed portion (step 706), the unit-of sub-record input/output buffer management processing unit 18 is called by securing request (step 708) and the buffer is secured. Then, the storage data is transferred to the buffer (step 710) and the record storage address and the output request flag are set (step 712). When the sub-record is the variable portion (step 706), whether there is the storage data or not is judged (step 718) and when there is not the storage data, any operation is not made.

When there is the storage data, the unit-of-sub-record input/output buffer management processing unit 18 is called by securing request (step 720) and the buffer is secured. An address of unoccupied area of the sub-record storage file of the variable portion is obtained and the storage address of the sub-record entry and the variable portion storage address in the final sub-record of the fixed portion are updated by the obtained address (step 724). Then, after the storage data is transferred to the buffer (step 726), the output request flag is set (step 728).

Finally, when the process for all of the sub-records has been completed (step 714), the unit-of-sub-record parallel input/output processing unit 19 is called by output request (step 730) to store data. Then, the unit-of-sub-record input/output buffer management processing unit 18 is called by release request (step 732) and after the buffer is returned, the process is finished.

Figure 14:
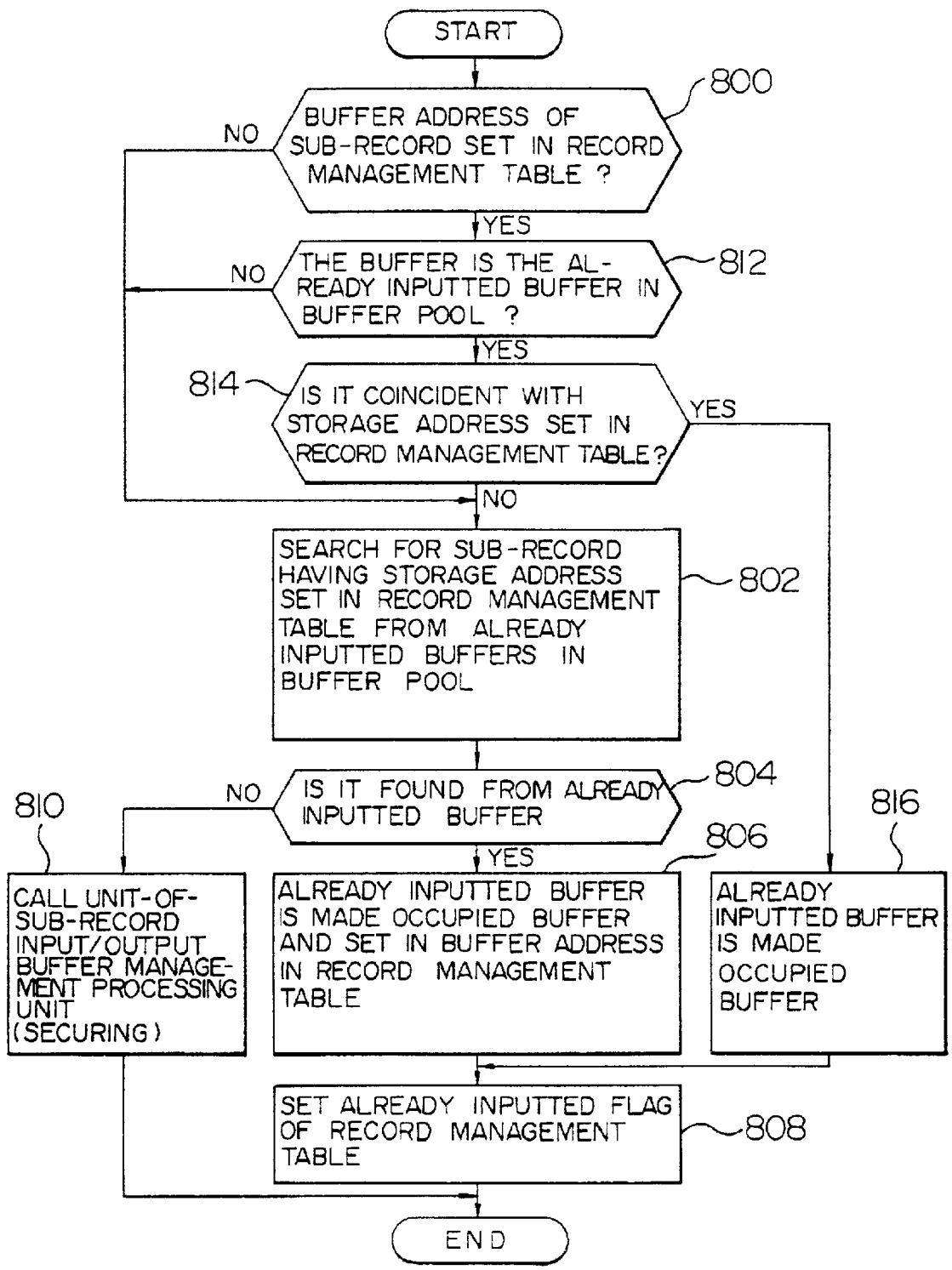
FIG. 14 is a flow chart showing a procedure of a search process of a unit-of-sub-record input/output buffer management processing unit of the embodiment.

Referring now to FIG. 14, the search process of the unit-of-sub-record input/output buffer management processing unit 18 is described.

First of all, whether the buffer address has been set in the sub-record entry of the designated record management table 45 or not is judged (step 800). When it has not been set and when it has been set but the buffer is not an already inputted buffer in buffer pool (step 812) or when the buffer is the already inputted buffer in buffer pool but sub-record of storage address set in the sub-record entry is not inputted (step 814), the sub-record having the storage address set in the sub-record entry is searched for from the already inputted buffer in the buffer pool(step 802).

As a result of the search, when it is found from the already inputted buffer (step 804), the already inputted buffer is made an occupied buffer and the address of the buffer is set in the buffer address of the sub-record entry (step 806). Then, the already inputted flag is set (step 808) and the process is finished. When it is not found from the already inputted buffer in the buffer pool (step 804), the unit-of-sub-record input/output buffer management processing unit 18 is called by securing request (step 810) and after a new buffer is secured, the process is finished.

On the other hand, when the buffer of the buffer address designated by the sub-record entry is the already inputted buffer in the buffer pool (step 812) and the sub-record of the designated storage address is inputted (step 814), the already inputted buffer is made an occupied buffer (step 816). Then, the already inputted flag of the sub-record entry is set (step 808) and the process is finished.

Figure 16:
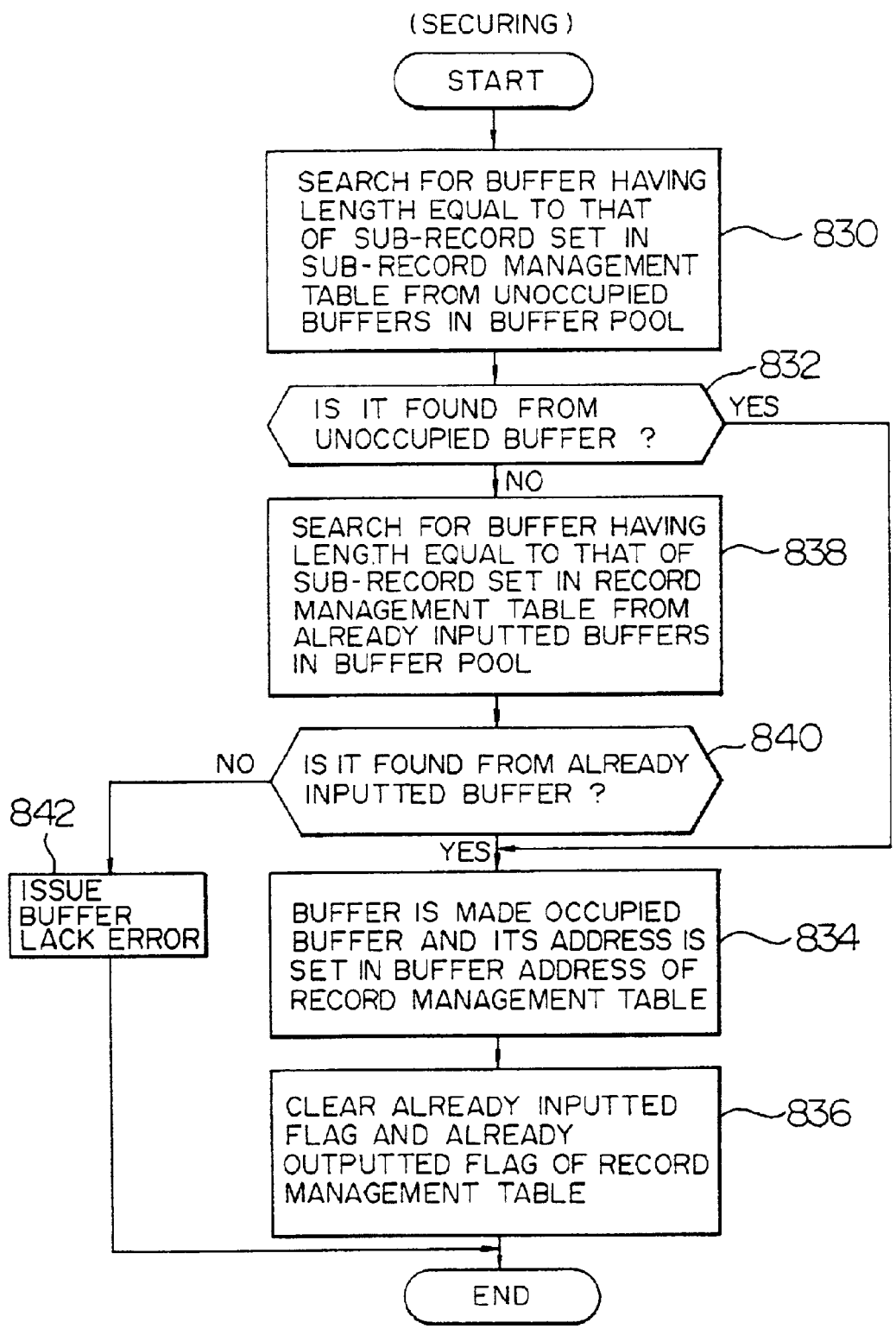
FIG. 16 is a flow chart showing a procedure of a securing process of the unit-of-sub-record input/output buffer management processing unit of the embodiment.

Referring now to FIGS. 15 and 16, the return process, the securing process and the release process of the unit-of-sub-record input/output buffer management processing unit 18 are described.

Operation of the return process is now described. An entry is positioned at the top sub-record of the record management table 45 (step 820) and when the buffer address has been set with respect to all of sub-record entries of the record management table 45 (step 822), the process of returning the buffer to the already inputted buffer in the buffer pool (step 824) is repeated (steps 826 and 828).

Operation of the securing process is now described.

The buffer having a length equal to that of the sub-record set in the sub-record entry of the record management table 45 is searched for from unoccupied buffers in buffer pool (step 830). When it is found from the unoccupied buffer (step 832), the buffer is made an occupied buffer and its address is set in the buffer address of the sub-record entry (step 834). Then, the already inputted flag and the already outputted flag are cleared (step 836) and the process is finished.

When it is not found from the unoccupied buffer (step 832), the buffer having a length equal to that of the sub-record set in the sub-record entry is searched for from the already inputted buffers in the buffer pool (step 838). When it is found from the already inputted buffer (step 840), setting of the buffer address (step 834) and clearing of the flag (step 836) are made similarly and the process is finished.

When it is not found even from the already inputted buffers (step 840), a buffer lack error is issued (step 842) and the process is finished.

Operation of the release process is now described.

The buffer designated by the buffer address of the sub-record entry of the record management table 45 is made an unoccupied buffer in the buffer pool (step 850). Then, the buffer address of the sub-record entry is cleared (step 852) and the process is finished.

Referring now to FIG. 17, the input process of the unit-of-sub-record parallel input/output means 19 is described.

An entry is positioned at the top sub-record of the record management table 45 (step 900). Whether the input request flag and the already inputted flag are set or not is judged for all of sub-record entries of the record management table and when not set (step 902), the storage address of the sub-record entry is converted into a physical address (step 904). Then, the process of requiring input of the physical record to buffer set from the sub-record storage file (step 906) is repeated (steps 908 and 910).

After the process for all of sub-record entries has been completed, Whether all of sub-records required to be inputted have been inputted or not is judged (step 912). If there is any sub-record not inputted, the process waits for its input (step 914).

The completion of input/output of the sub-records is reported by an input/output completion interrupt and the completed input/output request is investigated (step 918). Then, the input/output completion is reported to the input/output request process (step 920).

After the input of all of sub-records required to be inputted has been completed, an already inputted flag is set in the sub-record entry of all of sub-records required to be inputted (step 916) and the process is finished.

Figure 18:
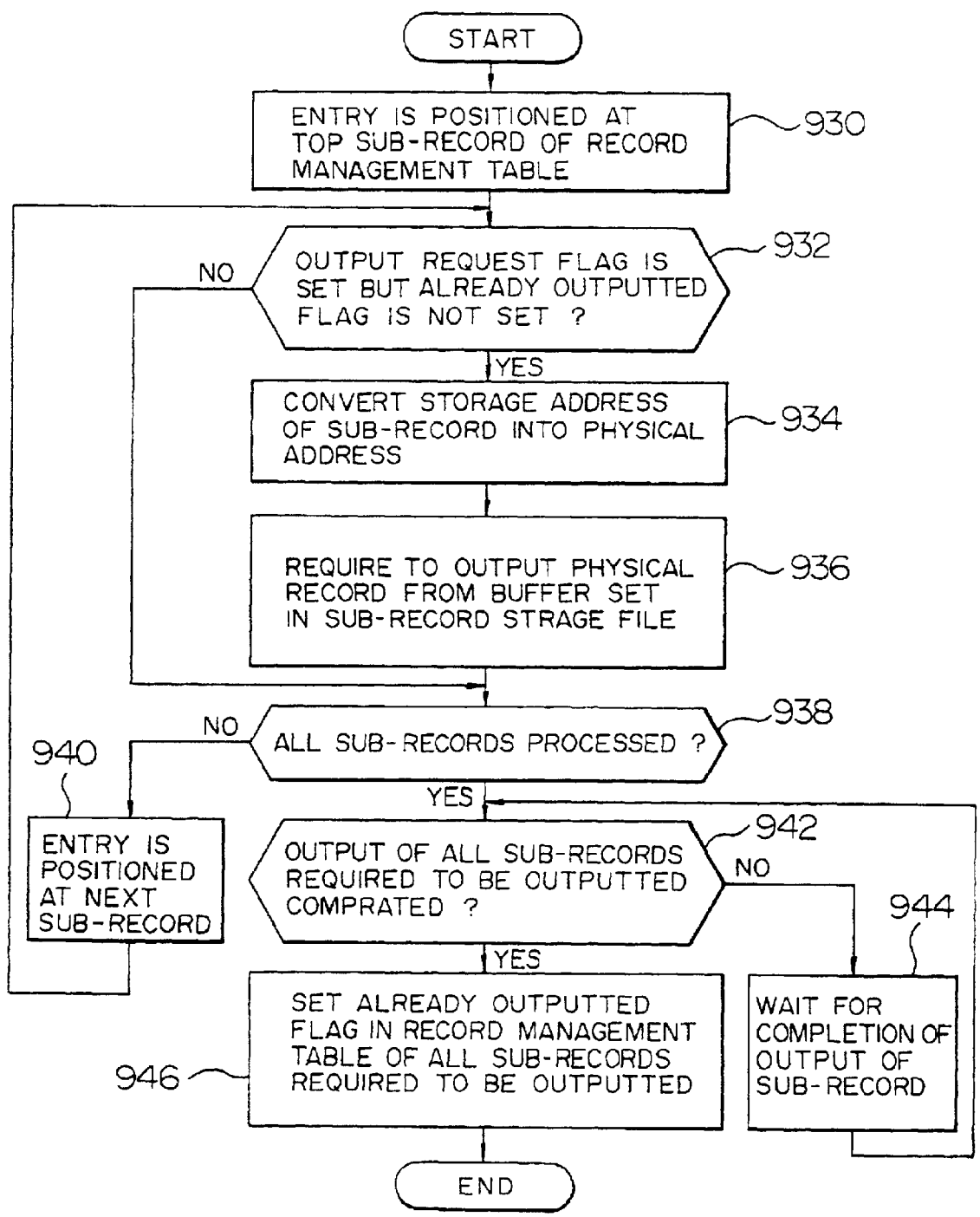
FIG. 18 is a flow chart showing a procedure of an output process of the unit-of-sub-record parallel input/output processing unit of the embodiment.

Referring now to FIG. 18, the output process of the unit-of-sub-record parallel input/output means 19 is described.

First of all, an entry is positioned at the top sub-record of the record management table 45 (step 930). Whether the output request flag is set and the already outputted flag is not set is judged with respect to all of sub-record entries of the record management table and when the output request flag is set but the already outputted flag is not set (step 932), the storage address of the sub-record entry is converted into a physical address (step 934). Then, the process of requiring to output the physical record from the buffer set in the sub-record storage file (step 936) is repeated (steps 928 and 940).

After the process for all of sub-record entries has been completed (step 938), whether output of all of sub-records required to be outputted has been completed is judged (step 942) and when there is any output not completed, the process waits for its completion (step 944).

The completion of input/output of sub-record is reported by the input/output completion interrupt in the same manner as in the input request and the completed input/output request is investigated (step 918). Then, the input/output completion is reported to the input/output request process (step 920). After the output of all of sub-records required to be outputted has been completed (step 942), an already outputted flag is set in the sub-record entry of all of sub-records required to be outputted (step 946) and the process is finished.

According to the embodiment, a large number of data processes of long data can be performed effectively at high speed by the minimum input/output process using the limited input/output buffer area.

Further, retrieval of condition of data requiring reading of a large amount of data can be performed at high speed by the minimum input/output process using the limited input/output buffer without unnecessary input/output of data having no relation to judgment of condition in record.

Update of partial data in long record can be performed at high speed by the minimum input/output process using the limited input/output buffer without unnecessary input/output of data having no relation to update in record.

When the record is divided into a plurality of files to be stored, management of storage location of data is simplified, so that parallel input/output of data of the plurality of files and input/output of partial data of any files can be attained.

When the record of variable data format is divided into a plurality of files to be stored, storage space efficiency can be increased.

Further, when the record of variable data format is divided into a plurality of files to be stored, rewriting process of file can be performed at high speed.

In the record retrieval instruction having the retrieval condition, when a desired data can not be retrieved directly by the key item or index, the sub-record actually inputted is limited to only portion necessary to judgment of retrieval condition and accordingly the retrieval instruction can be executed even by a small number of input/output buffers as compared with the case where all of sub-records are always inputted in unit of record.

If the input/output buffer having a length equal to that of the record can be prepared, the number of input/output buffers for continuously inputting only the sub-record necessary for judgment of retrieval condition collectively can be increased and accordingly the retrieval instruction can be executed at high speed.

Since an amount of data inputted from the external memory unit to the central processing unit is small as compared with the case where all of sub-records are always inputted, the retrieval instruction can be executed at high speed and the occupancy rate of the input/output channel can be reduced.

In the update of record, since the sub-record actually inputted and outputted is limited to only the sub-record including data required to be updated, the retrieval instruction can be executed even by a smaller number of input/output buffers as compared with the case where all of sub-records are always inputted/outputted in unit of record. Further, since an amount of input/output data between the external memory unit and the central processing unit is smaller as compared with the case where all of sub-records are always inputted/outputted in unit of record, the retrieval instruction can be executed at high speed and the occupancy rate of the input/output channel can be reduced.

Further, when the length of all of sub-records obtained by dividing the record is identical and each of sub-records is made a fixed length type file having the same capacity and capable of being inputted/outputted independently, the record storage address determined by arrangement of records and key item can be made identical with respect to actual values of all sub-records constituting actual value of one record. Accordingly, parallel input/output of all sub-records and individual input/output of sub-records can be attained and a storage address decision mechanism in each input/output can be unified and simplified.

When the record format is of a variable length, the record is divided into a fixed length portion and a variable length portion. Data having a fixed length is made the fixed length portion and is divided by the same sub-record length. Data exceeding it is made the variable length portion and is stored in the variable length type file as sub-records, so that the capacity for actual data amount of the variable length portion is sufficient for the storage file of the variable length portion and accordingly a necessary file capacity can be reduced as compared with the case where all data is handled by the fixed length type. The provision of the storage address in which the sub-record actual value of the variable length portion corresponding to the final sub-record actual value of the fixed length portion is stored can maintain the relation between sub-records of the fixed length portion and the variable length portion constituting the record.

Further, when the file for storing the sub-records of the variable length portion becomes full by means of addition and deletion of records or when useless unoccupied space is increased, only final sub-records of the fixed length portions are all inputted and the sub-records of corresponding variable portions can be stored in other files. Accordingly, the rewriting process of files can be performed at high speed as compared with the case where all sub-records are always inputted/outputted.

The above embodiment illustrates an example of the present invention and the present invention can not be limited thereto.

As described above, according to the present invention, there can be realized the data processing method and the apparatus therefor capable of performing a large number of data processes such as retrieval and update of long data effectively at high speed by the minimum input/output process using the limited input/output buffer area.

What is claimed is:

1. A data processing method in which a plurality of records, each including at least a plurality of fixed length data portions are divided and stored in a plurality of storage units, comprising:

dividing said fixed length data portion of each of said records into a plurality of fixed length sub-records having respective logical names;

storing said fixed length sub-records in a plurality of storage units such that said fixed length sub-records having a same logical name are stored in a same one of said storage units;

managing a storage situation of said storage units as file definition information collectively;

performing data processing of said record in a unit of sub-record with reference to said file definition information; and inputting a query, wherein, if one logical name is specified in the query, said fixed length sub-records having the specified logical name are read from the same storage unit.

2. A data processing method according to claim 1, wherein said step of performing includes the steps of:

determining at least one sub-record based on the query;

reading the at least one determined sub-record in a record from one of the storage units;

checking whether the at least one read sub-record meets the query; and if the at least one read sub-record meets the query, reading other sub-records in the record from other of the storage units.

3. A data processing method in which a plurality of records, each including at least a plurality of fixed length data portions are divided and stored in a plurality of storage units comprising:

dividing said fixed length data portion of each of said records into a plurality of fixed length sub records having respective logical names;

storing said fixed length sub-records in a plurality of storage units such that said fixed length sub-records having a same logical name are stored in a same one of said storage units;

generating file definition information which correlates the sub records to the storage units;

accessing one of said sub-records with reference to said file definition information; and performing data processing in accordance with the one sub-record; and inputting a query, wherein, if one logical name is specified in the query, said fixed length sub-records having the specified logical name are read from the same storage unit.

4. A data processing method according to claim 3, wherein said fixed length sub-records are stored in locations having the same physical address of said plurality of storage units.

5. A data processing method according to claim 3, wherein data processing of said record includes retrieval, update, addition, and deletion.

6. The data processing method of claim 3, wherein said fixed length sub-records are stored in the storage units at identical addresses thereof.

7. The data processing method according to claim 3, wherein said fixed length sub-records are stored in identical physical locations within respective ones of the storage units.

8. A data processing system in which a plurality of records, each including at least a plurality fixed length data portions are divided and stored in a plurality of storage units, comprising:

means for dividing said fixed length data portion of each of said records into a plurality of fixed length sub-records having respective logical names;

means for storing said fixed length sub-records in a plurality of storage units such that said fixed length sub-records records having a same logical name are stored in a same one of said storage units;

means for managing a storage situation of said storage units as file definition information collectively;

means for performing data processing of said record in a unit of sub-record with reference to said file definition information; and means for inputting a query wherein, if one logical name is specified in the query, said fixed length sub-records having the specified logical name are read from the same storage unit.

9. A data processing system according to claim 8, wherein said performing means includes:

means for determining at least one sub-record based on the query;

means for reading the at least one determined sub-record in a record from one of the storage units;

means for checking whether the at least one read sub-record meets the query; and if the at least one read sub-record meets the query, reading other sub-records in the record from other storage units with said means for reading.

10. A data processing system in which a plurality of records, each including at least a plurality of fixed length data portions are divided and stored in a plurality of storage units comprising:

means for dividing said fixed length data portion of each of said records into a plurality of fixed length sub records;

means for storing said fixed length sub-records in a plurality of storage units such that said fixed length sub-records having a same logical name are stored in a same one of said storage units;

means for generating file definition information which correlates the sub records to the storage units;

means for accessing one of said sub-records with reference to said file definition information; and means for performing data processing in accordance with the one sub-record; and means for inputting a query, wherein, if one logical name is specified in the qeury, said fixed length sub-records having the specified logical name are read from the same storage unit.

11. A data processing method according to claim 10, wherein said means for storing stores said fixed length sub-records are stored in locations having the same physical address of said plurality of storage units.

12. A data processing method according to claim 10, wherein data processing system of said record includes means for retrieval, update, addition, and deletion.

13. The data processing method of claim 10, wherein said means for storing stores said fixed length sub-records in the storage units at identical addresses thereof.

14. The data processing method according to claim 10, wherein said means for storing stores said fixed length sub-records in identical physical locations within respective storage units.

* * * * *